(12) United States Patent
Pronovost

(10) Patent No.: US 12,217,515 B2
(45) Date of Patent: Feb. 4, 2025

(54) TRAINING A CODEBOOK FOR TRAJECTORY DETERMINATION

(71) Applicant: Zoox, Inc., Foster City, CA (US)

(72) Inventor: Ethan Miller Pronovost, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 404 days.

(21) Appl. No.: 17/855,696

(22) Filed: Jun. 30, 2022

(65) Prior Publication Data

US 2024/0104934 A1 Mar. 28, 2024

(51) Int. Cl.
*G06V 20/58* (2022.01)
*B60W 40/10* (2012.01)

(52) U.S. Cl.
CPC ............. *G06V 20/58* (2022.01); *B60W 40/10* (2013.01); *B60W 2554/4049* (2020.02)

(58) Field of Classification Search
CPC ..... B60W 60/0027; B60W 2050/0028; B60W 2554/404; B60W 2554/4046; B60W 2554/4049; B60W 40/04; B60W 40/10; B60W 50/0097; G06N 3/04; G06N 3/045; G06V 10/774; G06V 10/82; G06V 20/58
See application file for complete search history.

(56) References Cited

U.S. PATENT DOCUMENTS

| | | |
|---|---|---|
| 10,019,011 B1 | 7/2018 | Green et al. |
| 10,421,453 B1 | 9/2019 | Ferguson et al. |
| 10,459,444 B1 | 10/2019 | Kentley-Klay |
| 10,671,076 B1 | 6/2020 | Kobilarov et al. |
| 11,370,424 B1 | 6/2022 | Cohen et al. |
| 11,960,292 B2 | 4/2024 | Nayhouse et al. |
| 2017/0132334 A1 | 5/2017 | Levinson et al. |
| 2019/0072966 A1 | 3/2019 | Zhang et al. |
| 2019/0129436 A1 | 5/2019 | Sun et al. |
| 2019/0147610 A1 | 5/2019 | Frossard et al. |
| 2019/0152490 A1 | 5/2019 | Lan et al. |

(Continued)

FOREIGN PATENT DOCUMENTS

CN 113936243 1/2022

OTHER PUBLICATIONS

ICLR 2021 Conference Paper 2345 Authors, Official Comment on Latent Optimization Variational Autoencoder for Conditional Molecular Generation [online], Nov. 13, 2020 (last modification date)Y [retrieved on Mar. 11, 2024]. Retrieved from <URL: https://openreview.net/forum?id=BKIS2NCUro9¬eld=mvlj6-YW5kv>; 11 pages.

(Continued)

*Primary Examiner* — Manuchehr Rahmjoo
(74) *Attorney, Agent, or Firm* — Lee & Hayes, P.C.

(57) ABSTRACT

Techniques for training a codebook usable by a machine learned model to predict an object trajectory or scene data are described herein. For example, the techniques may include generating tokens representing discrete object behavior into a machine learned model that outputs a sequence of tokens that is usable by another machine learned model to generate the object trajectory (e.g., position data, velocity data, acceleration data, etc.) or the scene data associated with the environment. The object trajectory can be sent to a vehicle computing device for consideration during vehicle planning, which may include simulation.

20 Claims, 10 Drawing Sheets

(56) References Cited

U.S. PATENT DOCUMENTS

| | | |
|---|---|---|
| 2019/0164007 A1 | 5/2019 | Liu et al. |
| 2019/0303759 A1 | 10/2019 | Farabet et al. |
| 2019/0332875 A1 | 10/2019 | Vallespi-Gonzalez et al. |
| 2020/0148201 A1 | 5/2020 | King et al. |
| 2020/0174481 A1 | 6/2020 | Van Heukelom et al. |
| 2020/0180647 A1 | 6/2020 | Anthony |
| 2020/0216085 A1 | 7/2020 | Bobier-Tiu et al. |
| 2020/0225669 A1 | 7/2020 | Silva et al. |
| 2020/0283016 A1 | 9/2020 | Blaiotta |
| 2020/0324795 A1 | 10/2020 | Bojarski et al. |
| 2020/0380085 A1 | 12/2020 | Behrendt |
| 2020/0409368 A1 | 12/2020 | Caldwell et al. |
| 2020/0409378 A1 | 12/2020 | Benisch et al. |
| 2021/0114617 A1 | 4/2021 | Phillips et al. |
| 2021/0286924 A1 | 9/2021 | Wyrwas et al. |
| 2021/0341927 A1 | 11/2021 | Refaat et al. |
| 2021/0347382 A1 | 11/2021 | Huang et al. |
| 2022/0153314 A1* | 5/2022 | Suo .................. G06N 3/045 |
| 2022/0161811 A1 | 5/2022 | Lu et al. |
| 2023/0121388 A1 | 4/2023 | Taslim et al. |
| 2024/0101150 A1 | 3/2024 | Pronovost |
| 2024/0101157 A1 | 3/2024 | Pronovost |
| 2024/0104934 A1 | 3/2024 | Pronovost |
| 2024/0210942 A1 | 6/2024 | Pronovost |
| 2024/0211731 A1 | 6/2024 | Pronovost |
| 2024/0211797 A1 | 6/2024 | Pronovost |
| 2024/0212360 A1 | 6/2024 | Pronovost |

OTHER PUBLICATIONS

Office Action for U.S. Appl. No. 17/855,671, Dated Jun. 21, 2024, 13 pages.

The PCT Search Report and Written Opinion mailed Apr. 29, 2024 for PCT Application No. PCT/US2023/084627 from PCT Summary, 11 pages.

The PCT Search Report and Written Opinion mailed Apr. 18, 2024 for PCT Application No. PCT/US2023/084618 from PCT Summary, 13 pages.

Bruno Sauvalle et al., Autoencoder-based background reconstruction and foreground segmentation with background noise estimation [online], Jun. 27, 2022\Y [retrieved on Mar. 11, 2024]. Retrieved from<URL: https://www.researchgate.net/publication/357068811>4, 12pages 19-20; and tables 7-8.

Arsal Syed, Forecasting Pedestrian Trajectory Using Deep Learning, In: Unlv Theses, Dissertations, Professional Papers, and Capstones [online], 2021Y [retrieved on Mar. 11, 2024]. Retrieved from <URL: https://digitalscholarship.unlv.edu/theses dissertations/4269>pp. 2-49; table 2.1; and figures 1.2, 5.1, 67 pages.

Hao Xue, Deep Learning Based Pedestrian Trajectory Prediction, In: Thesis—Doctor of Philosophy (research output) [online], 2020Y [retrieved on Mar. 11, 2024]. Retrieved from <URL: https://research-repository.uwa.edu.au/en/publications/deep-learning-based-pedestrian-trajectory-prediction>1-5,7-13pages 3-109; and figure 6.4, 3 pages, 171 pages.

* cited by examiner

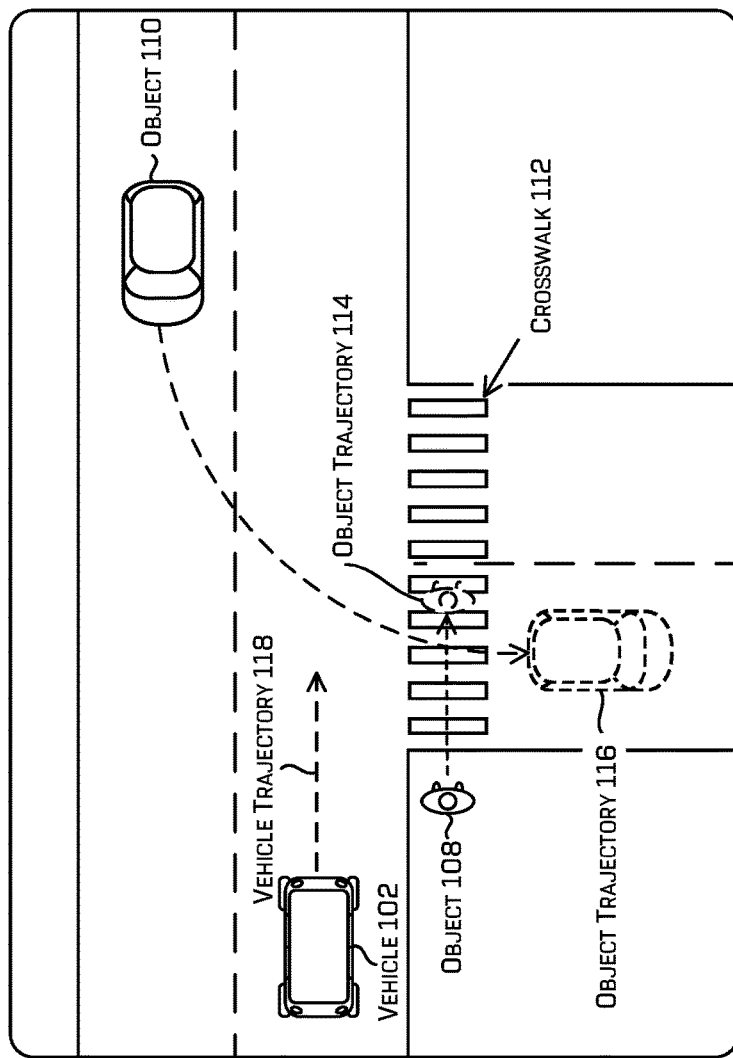
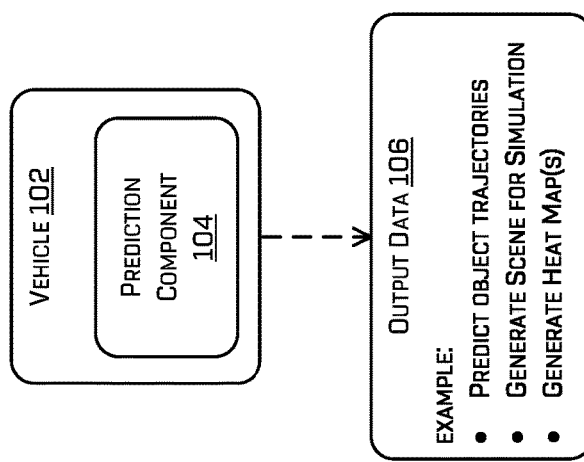
FIG. 1

TRAINING A CODEBOOK FOR TRAJECTORY DETERMINATION

BACKGROUND

Machine learned models can be employed to predict an action for a variety of robotic devices. For instance, planning systems in autonomous and semi-autonomous vehicles determine actions for a vehicle to take in an operating environment. Actions for a vehicle may be determined based in part on avoiding objects present in the environment. For example, an action may be generated to yield to a pedestrian, to change a lane to avoid another vehicle in the road, or the like. Accurately predicting future object trajectories may be necessary to safely operate the vehicle in the vicinity of the object.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1 is an illustration of an autonomous vehicle in an example environment, in which an example machine learned model may process input data to predict an object trajectory or a scene.

DETAILED DESCRIPTION

Figure 2:
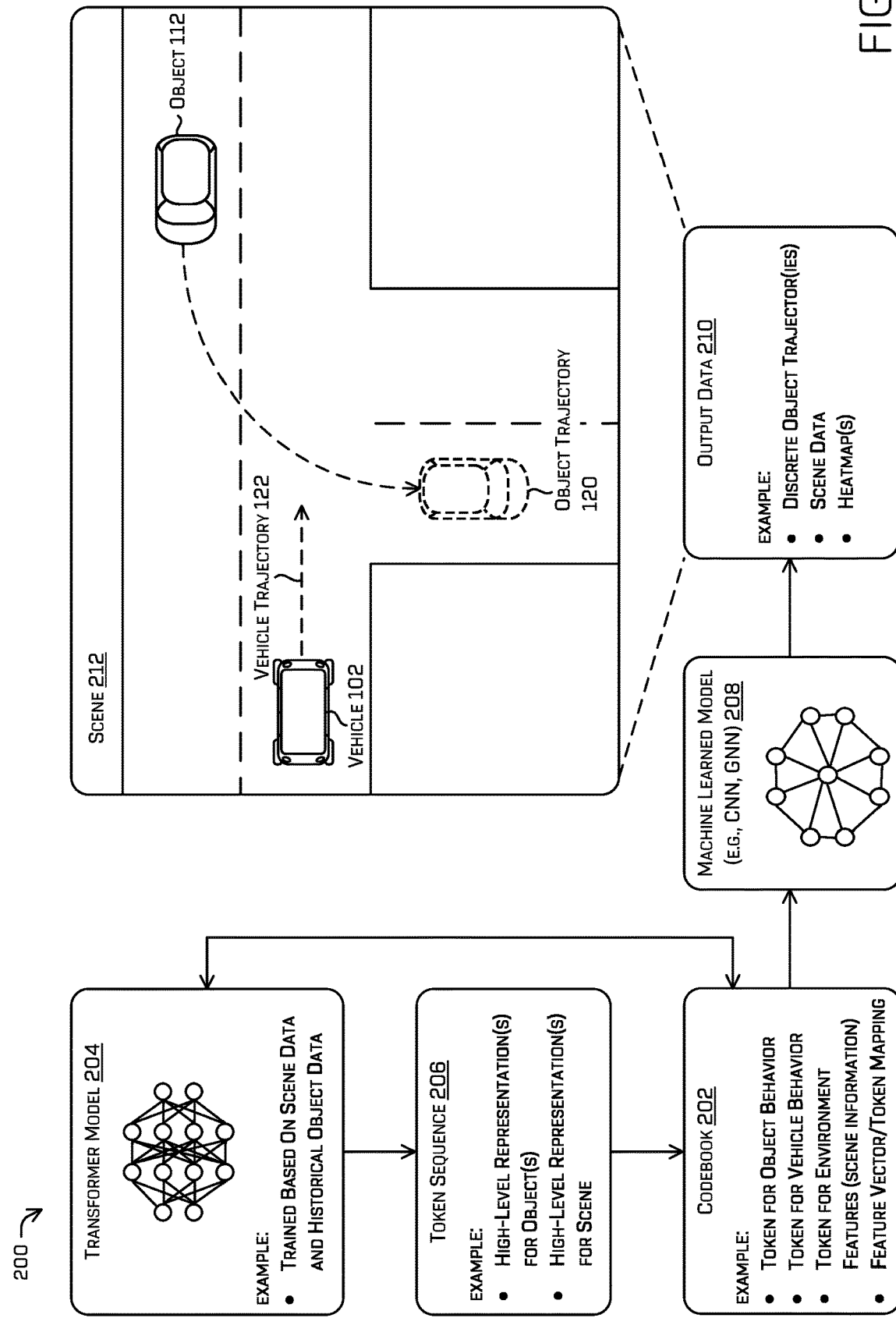
FIG. 2 illustrates an example block diagram of an example computer architecture for implementing techniques to generate example output data, as described herein.

This application further describes techniques for training a codebook to include tokens that may represent potential actions of an object and/or a vehicle in an environment. For example, one or more machine learned models may process tokens from the codebook, and predict motion (e.g., determine a trajectory) of an object in an environment at a future time. In some examples, a training component of a computing device can receive object state data and feature vectors that represent object behaviors as training data and generate a token to represent a state, an action, or a behavior of the object. The codebook can, for instance, be trained to include a fixed number of tokens. Tokens, feature vectors, or other data stored in associated with the codebook can be exchanged with other components or machine learned models. For example, a machine learned model (e.g., a Transformer) can receive tokens from a trained codebook and arrange the tokens in a sequence that represents potential interactions between a vehicle and one or more objects in an environment. Another machine learned model (e.g., a Generative Adversarial Network (GAN)) can receive the sequence as input and determine a trajectory or other characteristics of or associated with an object. In at least some examples, the object trajectory determined by the machine learned model(s) may be considered during vehicle planning thereby improving vehicle safety as a vehicle navigates in the environment by planning for the possibility that an object may intersect with the vehicle.

In some examples, a computing device may implement a prediction component comprising one or more machine learned models and a codebook to predict a future characteristic (e.g., a state, an action, etc.) for an object (e.g., a bicycle, a pedestrian, another vehicle, an animal, etc.) that may result in an impact to operation of an autonomous vehicle. For instance, a machine learned model may determine a possible trajectory (e.g., direction, speed, and/or acceleration) for an object to follow in an environment at a future time. In such an example, a vehicle computer device of the autonomous vehicle may predict a candidate trajectory for the vehicle (using a same or different model) with consideration to an output (e.g., the trajectory) from the machine learned model thereby improving vehicle safety by providing the autonomous vehicle with a candidate trajectory that is capable of safely avoiding the potential future positions of the object that may impact operation of the vehicle (e.g., intersect a trajectory of the autonomous vehicle, cause the autonomous vehicle to swerve or brake hard, etc.).

In some examples, a first machine learned model comprising one or more self-attention layers (e.g., a Transformer model) can receive tokens representing an object action, an object state, etc. from the codebook and arrange the tokens in a sequence to represent object behaviors (e.g., relative to the environment, relative to the autonomous vehicle, relative to another object, and so on). The first machine learned model can, for example, determine an output by using the one or more self-attention layers to arrange tokens in order or cluster the tokens. For instance, the first machine learned model can employ an autoregressive algorithm or other techniques to sample tokens from the codebook.

Generally, the arrangement, set, or cluster of tokens output by the first machine learned model represents discrete latent variables, or interactions between tokens. In some examples, the codebook can map, identify, or determine feature vectors that correspond to the discrete latent variables to represent the output of the first machine learned model as a set of feature vectors that represent continuous variables. For example, the codebook can convert the sequence of tokens that represents discrete latent variables into a new sequence of tokens that represents feature vectors. The feature vectors representing continuous variables can, for example, be fed into a second machine learned model (e.g., a decoder, a generator of a Generative Adversarial Network (GAN), a Graph Neural Network (GNN), a Recurrent Neural Network (RNN), another Transformer model, etc.) as input data to determine a potential action or behavior of one or more objects in an environment. In various examples, the second machine learned model can output data representing one or more of: an object trajectory, a heatmap showing a likelihood of occupancy by an object(s), object state data, or scene data usable in simulation, just to name a few. An output of the second machine learned model can be sent to the vehicle computing device for use in planning operations of a vehicle (e.g., to determine a candidate trajectory for the vehicle).

In some examples, the second machine learned model can generate a simulated environment that includes one or more object trajectories based at least in part on receiving a sequence of tokens representing feature vectors, though in some examples the second machine learned model can also or instead receive a sequence of tokens representing discrete latent variables. In various examples, the second machine learned model can determine a response by the vehicle to the object trajectory in the simulated environment and control the vehicle in a real-world environment based at least in part on the response.

A computing device can implement a training component to train the first machine learned model, the second machine learned model, the codebook, or other machine learned model described herein. For example, the first machine learned model (e.g., a Transformer model) can be trained based at least in part on a set of conditions representing a previous action, a previous position, or a previous acceleration of the object. In this way, the first machine learned model can be trained, or conditioned, to output a token sequence, a set of tokens, or a cluster of tokens based at least in part on specific characteristics of the object, the environment, or a vehicle having a vehicle computing device to implement these techniques. The second machine learned model can be trained to improve predictions that represent potential actions by objects in an environment of a vehicle based at least in part on the output by the first machine learned model (e.g., the token sequence, the set of tokens, or the cluster of tokens).

In various examples, the codebook can represent a statistical model and/or a machine learned model that is trainable to determine and store data associated with individual tokens, a sequence of tokens, feature vectors, or a combination thereof. In some examples, training the codebook can include determining a certain number of types of tokens available in the codebook usable to represent the vehicle, the object(s), and/or the environment and limiting the number of tokens for storage to the determined number. In some examples, the number of tokens in the codebook can affect sampling of the tokens by another entity such as the first machine learned model (e.g., a first token in the codebook can represent a state of an autonomous vehicle and a subsequent token can represent a state of an object so that the first token is considered differently when sampled for inclusion in a sequence).

In some examples, the training component can determine the tokens to include in the codebook based at least in part on receiving feature vectors from a machine learned model (e.g., a third machine learned model). For example, a computing device can receive sensor data, log data, map data, and so on, as input and determine feature vectors representing an object, a vehicle, and/or an environment. For example, a GNN can determine the feature vectors based at least in part on input data representing an object trajectory, an object state, a simulated scene, a real-world scene, etc. The codebook can receive the feature vectors from the machine learned model and map the feature vectors to corresponding tokens by comparing descriptions (e.g., metadata indicating an identifier, an index number, etc.) associated with each feature vector and token. In various examples, the feature vectors may be generated to represent a current state of the object (e.g., a heading, a speed, etc.) and/or a behavior of the object over time (e.g., a change in yaw, speed, or acceleration of the object). In some examples, the machine learned model determines additional feature vectors to represent other objects and/or features of the environment.

Feature vectors output from a machine learned model (e.g., the GNN or other model) can be input into a quantizer to generate discretized feature vectors for sending to the codebook (or other model or component of the computing device). In various examples, the codebook can receive the discretized feature vectors output by the quantizer and determine which token(s) of available tokens in the codebook are similar (e.g., information or characteristics associated with a feature vector (or object associated therewith) is similar to information or characteristics associated with a token (or object associated therewith), etc.). Quantization of the feature vectors enables the codebook to receive discrete feature vectors rather than continuous feature vectors which can enable the codebook to make better mappings between discrete feature vectors and tokens representing discrete latent variables. In some examples, the prediction component can implement the quantizer to train the codebook by providing discrete feature vectors as input to a training component that determines a token to correspond to the feature vectors and/or the discrete feature vectors.

In some examples, a model of the prediction component may define an algorithm for use in predicting a trajectory associated with an object. In some examples, the model to predict object trajectories may include one or more machine learned algorithm(s) to identify, detect, and/or classify attributes of a detected object. In some examples, the model may include one or more classifiers. A classifier can be representative of a decision tree, a Neural Network, a Naïve Bayes classifier, and/or other algorithm(s) that perform classification. In some examples, a classifier may represent a function that assigns a class or label to an object, targets an object in an environment, and/or categorizes an object. In some examples, a classifier can be used with a machine learning technique to train a model to perform a function (e.g., determine trajectories of an object, etc.).

In some examples, a machine learned model may receive a vector representation of data compiled into an image format representing a top-down view of an environment. The top-down view may be determined based at least in part on map data and/or sensor data captured from or associated with a sensor of an autonomous vehicle in the environment. The vector representation of the top-down view can represent one or more of: an attribute (e.g., position, class, velocity, acceleration, yaw, turn signal status, etc.) of an object, history of the object (e.g., location history, velocity history, etc.), an attribute of the vehicle (e.g., velocity, position, etc.), crosswalk permission, traffic light permission, and the like. The data can be represented in a top-down view of the environment to capture context of the autonomous vehicle (e.g., identify actions of other vehicles and pedestrians relative to the vehicle).

In some examples, a machine learned model may receive a vector representation of data associated with one or more objects in the environment. For instance, the machine learned model can receive (or in some examples determine) one or more vectors representing one or more of: position data, orientation data, heading data, velocity data, speed data, acceleration data, yaw rate data, or turning rate data associated with the object.

In various examples, the vehicle computing device may be configured to determine actions to take while operating (e.g., trajectories to use to control the vehicle) based on predicted object trajectories, heatmap data, scene data, etc. determined by one or more models. The actions may include a reference action (e.g., one of a group of maneuvers the vehicle is configured to perform in reaction to a dynamic operating environment) such as a right lane change, a left lane change, staying in a lane, going around an obstacle (e.g., double-parked vehicle, a group of pedestrians, etc.), or the like. The actions may additionally include sub-actions, such as speed variations (e.g., maintain velocity, accelerate, decelerate, etc.), positional variations (e.g., changing a position in a lane), or the like. For example, an action may include staying in a lane (action) and adjusting a position of the vehicle in the lane from a centered position to operating on a left side of the lane (sub-action).

For each applicable action and sub-action, the vehicle computing system may implement different model(s) and/or component(s) to simulate future states (e.g., estimated states) by projecting an autonomous vehicle and relevant object(s) forward in the environment for the period of time (e.g., 5 seconds, 8 seconds, 12 seconds, etc.). The model(s) may project the object(s) (e.g., estimate future positions of the object(s)) forward based on a predicted trajectory associated therewith. For instance, the model(s) may predict a trajectory of a vehicle and predict attributes about the vehicle including whether the trajectory will be used by vehicle to arrive at a predicted location in the future. The vehicle computing device may project the vehicle (e.g., estimate future positions of the vehicle) forward based on the vehicle trajectories output by the model. The estimated state(s) may represent an estimated position (e.g., estimated location) of the autonomous vehicle and an estimated position of the relevant object(s) at a time in the future. In some examples, the vehicle computing device may determine relative data between the autonomous vehicle and the object(s) in the estimated state(s). In such examples, the relative data may include distances, locations, speeds, directions of travel, and/or other factors between the autonomous vehicle and the object. In various examples, the vehicle computing device may determine estimated states at a predetermined rate (e.g., 10 Hertz, 20 Hertz, 50 Hertz, etc.). In at least one example, the estimated states may be performed at a rate of 10 Hertz (e.g., 80 estimated intents over an 8 second period of time).

In various examples, the vehicle computing system may store sensor data associated with an actual location of an object at the end of the set of estimated states (e.g., end of the period of time) and use this data as training data to train one or more models. For example, stored sensor data (or perception data derived therefrom) may be retrieved by a model and be used as input data to identify cues of an object (e.g., identify a feature, an attribute, or a pose of the object). Such training data may be determined based on manual annotation and/or by determining a change associated semantic information of the position of the object. Further, detected positions over such a period of time associated with the object may be used to determine a ground truth trajectory to associate with the object. In some examples, the vehicle computing device may provide the data to a remote computing device (i.e., computing device separate from vehicle computing device) for data analysis. In such examples, the remote computing device may analyze the sensor data to determine one or more labels for images, an actual location, yaw, speed, acceleration, direction of travel, or the like of the object at the end of the set of estimated states. In some such examples, ground truth data associated with one or more of: positions, trajectories, accelerations, directions, and so may be determined (either hand labelled or determined by another machine learned model) and such ground truth data may be used to determine a trajectory of an object. In some examples, corresponding data may be input into the model to determine an output (e.g., a trajectory, scene data, and so on) and a difference between the determined output, and the actual action by the object (or actual scene data) may be used to train the model.

The machine learned model may be configured to determine an initial position of each object in an environment (e.g., a physical area in which a vehicle operates and/or a simulated environment) indicated by the sensor data. Each determined trajectory may represent a potential direction, speed, and acceleration that the object may travel through the environment. The object trajectories predicted by the models described herein may be based on passive prediction (e.g., independent of an action the vehicle and/or another object takes in the environment, substantially no reaction to the action of the vehicle and/or other objects, etc.), active prediction (e.g., based on a reaction to an action of the vehicle and/or another object in the environment), or a combination thereof.

As described herein, models may be representative of machine learned models, statistical models, heuristic models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

The techniques discussed herein may improve a functioning of a vehicle computing system in a number of ways. The vehicle computing system may determine an action for the autonomous vehicle to take based on a determined trajectory of the object represented by data. In some examples, using the trajectory prediction techniques described herein, a model may output object trajectories and associated probabilities that improve safe operation of the vehicle by accurately characterizing motion of the object with greater detail as compared to previous models.

The techniques discussed herein can also improve a functioning of a computing device in a number of additional ways. In some cases, representing the environment and the object(s) as tokens can represent a simplified representation of the environment for the purposes of generating prediction probability(ies). In some cases, the tokens can represent the environment without extracting particular features of the environment, which may simplify the generation of the prediction system and subsequent generation of at least one predicted trajectory (e.g., reduce an amount of memory and/or processing resources). In some cases, evaluating an output by a model(s) may allow an autonomous vehicle to generate more accurate and/or safer trajectories for the autonomous vehicle to traverse an environment. In at least some examples described herein, predictions based on token sequences may account for object to object dependencies, yielding safer decision-making of the system. These and other improvements to the functioning of the computing device are discussed herein.

In some examples, the object trajectory determination techniques discussed herein may reduce training time by training in parallel and/or improve accuracy by reducing an amount of data to be stored. Further, such techniques provide for training networks based on larger datasets than would otherwise not be enabled due to, for example, limitations of memory, processing power, etc. (thereby creating more robust learned networks in shorter amounts of time).

The methods, apparatuses, and systems described herein can be implemented in a number of ways. Example implementations are provided below with reference to the following figures. Although discussed in the context of an autonomous vehicle in some examples below, the methods, apparatuses, and systems described herein can be applied to a variety of systems. In one example, machine learned models may be utilized in driver-controlled vehicles in which such a system may provide an indication of whether it is safe to perform various maneuvers. In another example, the methods, apparatuses, and systems can be utilized in an aviation or nautical context. Additionally, or alternatively, the techniques described herein can be used with real data (e.g., captured using sensor(s)), simulated data (e.g., generated by a simulator), or any combination thereof.

FIG. 1 illustrates an autonomous vehicle (vehicle 102) in an example environment 100, in which an example machine learned model (prediction component 104) may process input data to predict an object trajectory or a scene. As illustrated, the vehicle 102 includes the prediction component 104 that represents one or more machine learned models and a codebook for processing various types of input data (e.g., feature vectors, sensor data, map data, etc.) associated with the one or more objects in the environment 100, and determines output data 106 representing potential object trajectories and/or scene data usable for simulation. In some examples, the prediction techniques described herein may be implemented at least partially by or in association with a vehicle computing device (e.g., vehicle computing device 804) and/or a remote computing device (e.g., computing device(s) 834).

In various examples, a vehicle computing device associated with the vehicle 102 may be configured to detect one or more objects (e.g., objects 108 and 110) in the environment 100, such as via a perception component. In some examples, the vehicle computing device may detect the objects, based on sensor data received from one or more sensors. In some examples, the sensors may include sensors mounted on the vehicle 102, and include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. In various examples, the vehicle 102 may be configured to transmit and/or receive data from other autonomous vehicles and/or the sensors. The data may include sensor data, such as data regarding the objects detected in the environment 100.

In various examples, the vehicle computing device can receive the sensor data and can semantically classify the detected objects (e.g., determine an object type), such as, for example, whether the object is a pedestrian, such as object 108, a vehicle such as object 110, a building, a truck, a motorcycle, a moped, or the like. The objects may include static objects (e.g., buildings, bridges, signs, etc.) and dynamic objects such as other vehicles, pedestrians, bicyclists, or the like. In some examples, a classification may include another vehicle (e.g., a car, a pick-up truck, a semi-trailer truck, a tractor, a bus, a train, etc.), a pedestrian, a child, a bicyclist, a skateboarder, an equestrian, an animal, or the like. In various examples, the classification of the object may be used by a model to determine object characteristics (e.g., maximum speed, acceleration, maneuverability, etc.). In this way, potential trajectories by an object may be considered based on characteristics of the object (e.g., how the object may potentially move in the environment). As depicted in FIG. 1, the example environment 100 includes a crosswalk 112.

Generally, the prediction component 104 provides functionality to determine an object trajectory 114 associated with the pedestrian 108, and determine an object trajectory 116 associated with the vehicle 110. The prediction component 104 can also or instead predict scene data that describes a simulated environment. For instance, the prediction component 104 can output one or more scenes usable in a simulation (also referred to as a scenario or estimated states) to determine a response by the vehicle 102 to a simulated object. In some examples, the prediction component 104 can generate the output data 106 to represent one or more heat maps. In some examples, the one or more predicted trajectories may be determined or represented using a probabilistic heat map to predict object behavior, such as that described in U.S. patent application Ser. No. 15/807,521, filed Nov. 8, 2017, entitled "Probabilistic Heat Maps for Behavior Prediction," which is incorporated herein by reference in its entirety and for all purposes.

In some examples, the prediction component 104 may be configured to receive and/or determine vector representations of one or more of: environment data 100 (e.g., top-down view data), object state(s), and vehicle state(s). For example, the prediction component 104 can include a machine learned model (e.g., a Graph Neural Network) to generate one or more vectors to represent features of the environment (e.g., a roadway, a crosswalk, a building, etc.), a current state of an object (e.g., the pedestrian 108 and/or the vehicle 110), and/or a current state of the vehicle 102. In other examples, the feature vector(s) can represent a rasterized image based on top-down view data. Additional details about inputs to the prediction component 104 are provided throughout this disclosure.

In some examples, the prediction component 104 can represent one or more machine learned models that are configured to exchange data with the codebook that stores tokens that correspond to the feature vectors. For example, the feature vectors can represent continuous variables while the tokens can represent discrete latent variables. The codebook can receive feature vectors generated by a machine learned model (e.g., a first machine learned model) and map the feature vectors to a corresponding token. In some examples, the tokens can represent a behavior or feature of an object, the vehicle 102, or the environment 100. A token can, for instance, represent how the object can move in the environment 100 at a future time. Another machine learned model (e.g., a second machine learned model) can access tokens from the codebook and arrange them in a set, cluster, or sequence that represents how object(s) and the vehicle 102 can potentially interact. Another machine learned model (e.g., a third machine learned model such as a Generative Adversarial Network) can receive the set, cluster, or sequence of tokens as input and output the object trajectories 114 and 116. Additional details regarding using multiple machine learned model by the prediction component 104 can be found in FIGS. 2 and 3, and elsewhere.

In some examples, the prediction component 104 can include a quantizer to receive feature vectors as input and output discretized feature vectors. For instance, feature vectors output from a machine learned model (e.g., the GNN or other model) can be input into a quantizer to generate discretized feature vectors for sending to the codebook (or other model or component of a computing device associated with the vehicle 102). In some examples, the mapping of the tokens and feature vectors can include mapping a token to a discrete feature vectors output by the quantizer. Additional details of predicting object behavior using a GNN are described in U.S. patent application Ser. No. 17/681,461, filed on Feb. 22, 2022, entitled "Generating Predictions Based On Object Type," which is incorporated herein by reference in its entirety and for all purposes. Additional details of predicting object locations using a GNN are described in U.S. patent application Ser. No. 17/535,357, filed on Nov. 24, 2021, entitled "Encoding Relative Object Information Into Node Edge Features," which is incorporated herein by reference in its entirety and for all purposes.

The output data 106 from the prediction component 104 can be used by a vehicle computing device in a variety of ways. For instance, information about the object trajectories and/or the scene data can be used by a planning component of the vehicle computing device to control the vehicle 102 in the environment 100 (e.g., determine a vehicle trajectory 118 and/or control a propulsion system, a braking system, or a steering system). The output data 106 may also or instead be used to perform a simulation by setting up conditions (e.g., an intersection, a number of objects, a likelihood for the object to exhibit abnormal behavior, etc.) for use during the simulation.

A training component of a remote computing device, such as the computing device(s) 834 (not shown) and/or the vehicle computing device 804 (not shown) may be implemented to train the prediction component 104. Training data may include a wide variety of data, such as image data, video data, lidar data, radar data, audio data, other sensor data, etc., that is associated with a value (e.g., a desired classification, inference, prediction, etc.). In some examples training data can comprise determinations based on sensor data, such as a bounding boxes (e.g., two-dimensional and/or three-dimensional bounding boxes associated with an object), segmentation information, classification information, an object trajectory, and the like. Such training data may generally be referred to as a "ground truth." To illustrate, the training data may be used for image classification and, as such, may include an image of an environment that is captured by an autonomous vehicle and that is associated with one or more classifications. In some examples, such a classification may be based on user input (e.g., user input indicating that the image depicts a specific type of object) or may be based on the output of another machine learned model. In some examples, such labeled classifications (or more generally, the labeled output associated with training data) may be referred to as ground truth.

FIG. 2 illustrates an example block diagram 200 of an example architecture for implementing techniques to generate example output data as described herein. The example 200 includes a computing device (e.g., the vehicle computing device(s) 804 and/or the computing device(s) 834) that includes the prediction component in FIG. 1. In some examples, the techniques described in relation to FIG. 2 can be performed as the vehicle 102 navigates in the environment 100 (e.g., a real-world environment or a simulated environment).

As illustrated, a codebook 202 can store tokens that represent object behavior, vehicle behavior, and/or environment features. For example, a first token can represent an object state, a second token can represent a vehicle state, and a third token can represent environment features (e.g., a traffic signals, crosswalk, weather, etc.). The object state can indicate a position, orientation, velocity, acceleration, yaw, etc. of a object. A token may also or instead indicate an action by the object and/or the vehicle (e.g., go straight, turn right, turn left, etc.). In various examples, the codebook 202 can be configured to store a certain number of tokens.

In some examples, the tokens of the codebook 202 can represent discrete latent variables that enable a Transformer model 204 to sample tokens that represent potential interactions between a first object relative to a second object without relying on continuous distribution techniques (e.g., a Gaussian distribution) thereby saving computational resources.

In some examples, a first token in the codebook 202 can represent a characteristic (e.g., a state or an action) such as one of: a yield action, a drive straight action, a left turn action, a right turn action, a brake action, an acceleration action, a steering action, or a lane change action, and a second token can represents a position of the object. An additional token can represent an action or state associated with the vehicle 102.

In various examples, the codebook 202 can exchange data with a Transformer model 204 that is configured to output a token sequence 206. For example, the Transformer model 204 can sample tokens from the codebook 202 using an autoregressive technique and arrange the tokens in a sequence or set that represents potential interactions between objects and the vehicle. The Transformer model 204 can include one or more self-attention layers that arrange a subsequent token with consideration to a first token. For instance, a machine learned model with one or more self-attention layers can be configured to determine scores for at least some of the tokens from the codebook such as a first score indicating a dependency between a first token and a second token and a second score indicating a dependency between a third token and one of the first token, the second token, or a fourth token. In various examples, determining the sequence or set of tokens is based at least in part on the scores associated with various tokens.

In some examples, the Transformer model 204 can sample tokens from the codebook 202 using a combination of the autoregressive technique for some tokens and another technique different from the autoregressive technique for some other tokens. For example, the Transformer model 204 can determine the token sequence 206 by determining two or more tokens in the token sequence 206 using an autoregressive algorithm, and determining another token in the token sequence 206 randomly or without consideration to a previously determined token. In various examples, the Transformer model 204 can be trained using training data to condition the Transformer model 204 to determine the token sequence 206 with consideration to historical object state data, scene data, environmental data, and so on. For instance, training the Transformer model based at least in part on a set of conditions, at least one condition of the set of conditions comprising a previous action, a previous position, or a previous acceleration of the object. In this way, the Transformer model 204 can output the token sequence 206 having tokens that represent potential interactions between an object and the vehicle. Additional detail of training the codebook 202 is discussed in FIG. 5 and elsewhere.

Determining the token sequence 206 can be based at least in part on the fixed number of tokens in the codebook. For example, a first token can represent an action by the vehicle, and subsequent tokens can represent an action or state of an object, and yet another token can represent an action or state of an additional object. Thus, the token sequence 206 can represent potential interactions between two or more objects relative to the vehicle.

In some examples, the token sequence 206 can also or instead be based at least in part on a number of tokens in the codebook 202. For example, a greater number of tokens can result in more detailed interactions, but can take more processing resources to generate than using fewer tokens. To achieve optimal efficiency when determining the token sequence 206, the codebook 202 can be trained to include a particular number of tokens. Further, training the codebook 202 can include assigning a token to represent a previous state of an object. Additional detail of training the codebook 202 is discussed in FIG. 5 and elsewhere.

In some examples, the token sequence 206 can be input into a machine learned model 208 (e.g., a CNN, a GNN, etc.) configured to generate output data 210. In some examples, the output data 210 can include one or more: an object trajectory, a heatmap, or scene data. For instance, the output data 210 can include a scene 212 which can further include the object trajectory 116.

The machine learned model 208 can, for example, generate output data 210 for different times in the future. For instance, at a given time, the machine learned model 208 can generate the output data 210 for different times in the future (e.g., every 0.1 second for four second, or some other time period or frequency). In various examples, the machine learned model 208 can iteratively determine the output data 210 for each future time based at least in part on the output data 210 associated with a previous time. In other words, the machine learned model 208 can predict object trajectories, scenes, heat maps, or the like for different times in the future with later times considering potential actions by an object at a previous time.

In various examples, vectorized data (e.g., feature vectors) can be determined by a graph neural network which is a type of neural network which operates on a graph structure. In various examples, the graph neural network may be partially connected or fully connected with separate edge features associated with distinct pairs of nodes in the graph neural network. Machine-learning based inference operations may be performed to update the state of the graph neural network, including updating nodes and/or edge features, based on internal inputs determined from the graph neural network itself and/or based on updated observations perceived by the autonomous vehicle in the environment. Updates to the graph neural network may represent predicted future states of the environment, and the autonomous vehicle may decode portions of the graph neural network to determine predictions for entity positions, velocities, trajectories, and/or other updated predicted states for the entities in the environment. Additional details of graph neural networks are described in U.S. patent application Ser. No. 17/187,170, filed on Feb. 26, 2021, entitled "Graph Neural Network With Vectorized Object Representations in Autonomous Vehicle Systems," which is incorporated herein by reference in its entirety and for all purposes.

In various examples, the computing device generating feature vectors based at least in part on state data associated with a vehicle and/or object(s). The state data can include data describing an object (e.g., the pedestrian 108, the vehicle 110 in FIG. 1) and/or a vehicle (e.g., vehicle 102) in an environment, such as in example environment 100. The state data can include, in various examples, one or more of position data, orientation data, heading data, velocity data, speed data, acceleration data, yaw rate data, or turning rate data associated with the object and/or the vehicle.

In some examples, sensor data or processed sensor data (e.g., a top-down representation) may be input into a machine learned model (e.g., a convolutional neural network (CNN), a Recurrent Neural Network (RNN), a graph neural network (GNN), etc.), which can determine a feature vector for processing by a machine learned model. In some examples, functionality associated with the Transformer model 204, the codebook 202, and/or the machine learned model 208 can be included in the prediction component 104 to process, for example, feature vectors and determine the output data 210 indicative of the object trajectory 116 for the object 110.

Figure 3:
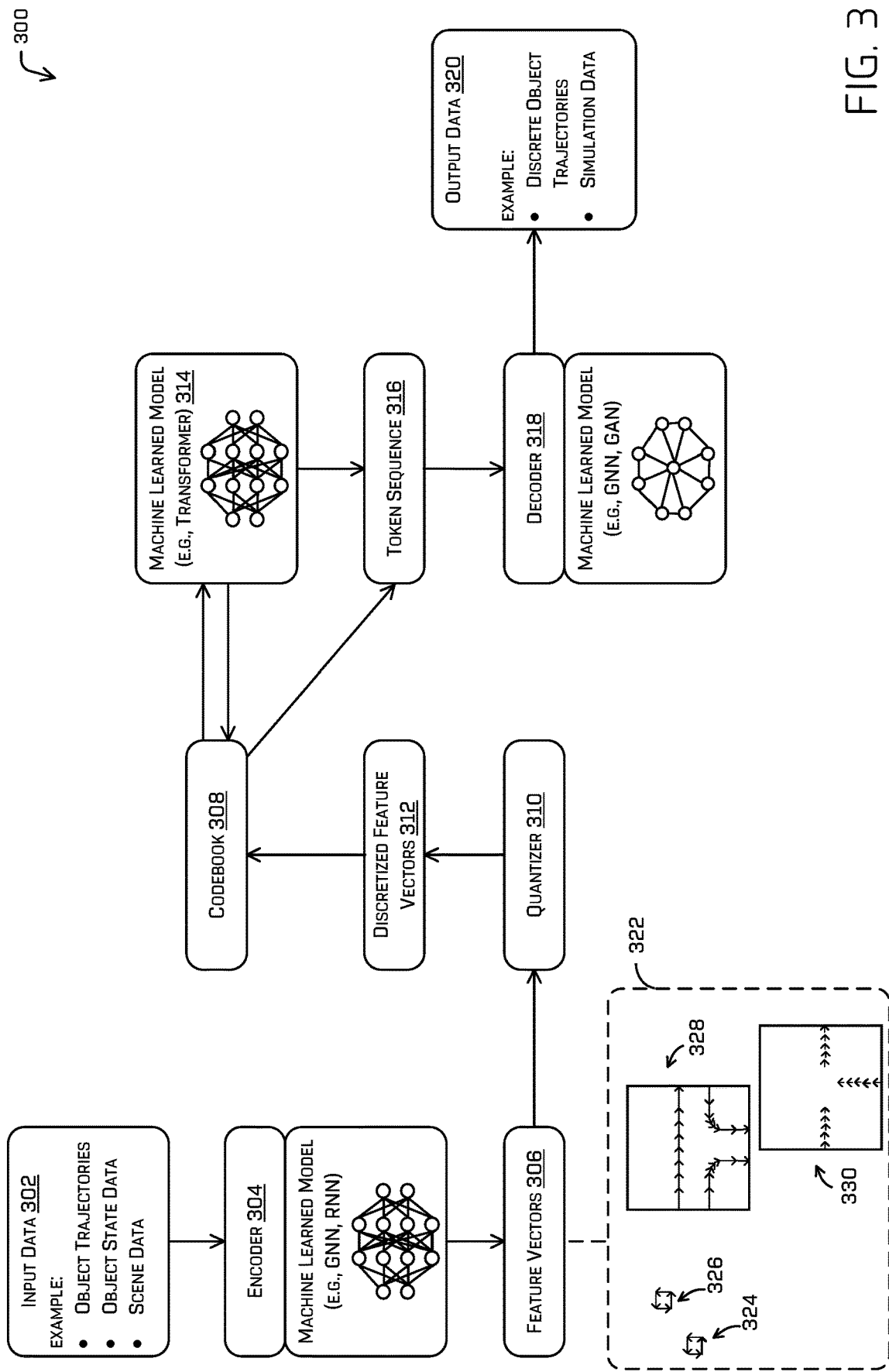
FIG. 3 illustrates another block diagram of an example computer architecture for implementing techniques to generate example output data, as described herein.

FIG. 3 illustrates an example block diagram 300 of an example computer architecture for implementing techniques to generate example output data as described herein. The example 300 includes a computing device (e.g., the vehicle computing device(s) 804 and/or the computing device(s) 834) that includes the prediction component in FIG. 1. In some examples, the techniques described in relation to FIG. 3 can be performed as the vehicle 102 navigates in the environment 100 (e.g., a real-world environment or a simulated environment).

As depicted in FIG. 3, input data 302 representing object trajectories associated with one or more objects, object state data, and scene data can be input into an encoder 304. The encoder 304 can represent a machine learned model such as a GNN, RNN, CNN, and the like, and output one or more feature vectors 306 which can be sent to a codebook 308 and a quantizer 310.

In some examples, the quantizer 310 can receive the feature vectors 306 output by the encoder 304, and discretize the feature vectors 306 to output the discretized feature vectors 312. In some examples, the codebook 308 can receive the discretized feature vectors 312 while in other examples the codebook 308 can receive the feature vectors 306. A machine learned model 314 (e.g., a Transformer model) can receive tokens, discrete feature vectors, and/or continuous feature vectors from the codebook and arrange the tokens and associated feature vectors into a token sequence 316. The token sequence 316 can represent tokens arranged or clustered in a particular order. The machine learned model 314 can include one or more self-attention layers to cause the tokens to be arranged with attention to features of another token.

In some examples, the codebook 308 can receive the discretized feature vectors 312 and determine the token sequence 316 by mapping index values of the discretized feature vectors 312 to corresponding index values of tokens. In FIG. 3, an arrow is shown from the codebook 308 to the token sequence 316 to indicate examples when the quantizer 310 "uses" the codebook 308 (or otherwise receives data from the codebook 308) to convert the discretized feature vectors 312 to tokens before being input into the decoder 318. (e.g., such as when the encoder 304, the quantizer 310, and the decoder 318 are being trained). In some examples, the quantizer 310 is not used, such as when the machine learned model 314 exchanges data with the codebook 308 to determine the token sequence 316. Thus, FIG. 3 represents different possible implementations which do not require all of the illustrated features.

In some examples, the machine learned model 314 can iteratively assign a token to a first object, followed by assigning a token to a second object, and so on for different objects in the environment. The machine learned model 314 can predict a probability that each token (or characteristics describing the token, or an object of the token) in the codebook corresponds to characteristics of the first object, and assign, or associating, the token having the highest probability as a first token of a token sequence. The machine learned model 314 can predict new probabilities for the tokens in the codebook (including the token assigned as the first token), and determine the second token after the first token based at least in part on the new probabilities. In some examples, a same token of the codebook can be assigned in another position of the sequence. Over time, the token sequence 316 can be determined to include a number of tokens based at least in part on a hyperparameter indicating a length, a size, or a total number of tokens to include in the token sequence.

In some examples, the order of the tokens in the token sequence 316 is determined based at least in part on a heuristic, or hyperparameter. For example, a heuristic can assign an order to a set of objects, and the machine learned model 314 can iteratively assign a token to each object in the set of objects. A first token (e.g., a state or an action) can be assigned to a first object, and a second token can be assigned to the first object or a second object. The second token can be assigned based at least in part on characteristics of the first object or first token.

In various examples, a decoder 318 can receive the token sequence 316 and determine the output data 320. The decoder 318 can represent a machine learned model such as a GNN, a GAN, an RNN, another Transformer model, etc. The output data 320 can, for example, be similar to the output data 106 or the output data 210 and represent an object trajectory, scene data, simulation data, and so on. In some examples, input data for the decoder 318 can be received from the codebook 308 and/or the machine learned model 314. For instance, the token sequence 316 can be sent from the machine learned model 314 to the decoder 318 and/or feature vectors associated with the token sequence 316 can be sent from the codebook 308 to the decoder 318.

In various examples, the feature vectors 306 can represent a vector representation 322 of an environment (e.g., the environment 100). By way of example and not limitation, the computing device may receive sensor data associated with an autonomous vehicle 324 (e.g., the vehicle 102) and an object 326 (e.g., the object 110). In some examples, the vector representation 322 can be determined by a graph neural network which is a type of neural network which operates on a graph structure. Machine-learning based inference operations may be performed to update the state of the graph neural network, including updating nodes and/or edge features, based on internal inputs determined from the graph neural network itself and/or based on updated observations perceived by the autonomous vehicle in the environment. Updates to the graph neural network may represent predicted future states of the environment, and the autonomous vehicle may decode portions of the graph neural network to determine predictions for object positions, velocities, trajectories, and/or other updated predicted states for the objects in the environment.

The vector representation 322 may, in some examples, be determined based on a polyline (e.g., a set of line segments) representing one or more map elements. For instance, the graph neural network can encode and aggregate the polyline into a node data structure representing with the map element (s). For example, an object or feature of the environment can be represented by polylines (e.g., a lane can be segmented into a number of smaller line segments whose length, location, orientation angle (e.g., yaw), and directionality, when aggregated, define the lane). Similarly, a crosswalk may be defined by four connected line segments, and a roadway edge or roadway centerline may be multiple connected line segments.

As shown in FIG. 3, the environment may be represented by the vector representation 322 comprising vectors to represent objects and/or features of the environment including one or more of: an attribute (e.g., position, velocity, acceleration, yaw, etc.) of the object 326, history of the object 326 (e.g., location history, velocity history, etc.), an attribute of the autonomous vehicle 324 (e.g., velocity, position, etc.), and/or features of the environment (e.g., roadway boundary, roadway centerline, crosswalk permission, traffic light permission, and the like). For instance, the vector representation 322 can comprise vectors to represent features of the environment including roadway boundary vectors 328 and roadway centerline vectors 330, among others.

In various examples, the computing device can implement the encoder 304 (or other machine learned model) to generate the vector representation 322 based at least in part on state data associated with the autonomous vehicle 324 and/or the object 326. The state data can include data describing an object (e.g., the pedestrian 108, the vehicle 110 in FIG. 1) and/or a vehicle (e.g., vehicle 102) in an environment, such as in example environment 100. The state data can include, in various examples, one or more of position data, orientation data, heading data, velocity data, speed data, acceleration data, yaw rate data, or turning rate data associated with the object and/or the vehicle. In some examples, vectors associated with an environment, a vehicle state, and/or an object state may be combined as the vector representation 322.

In some examples, the vector representation 322 may be input into a machine learned model (e.g., the decoder 318) which can determine the output data 320 indicative of predicted trajectories for the object(s) in the environment.

Figure 4:
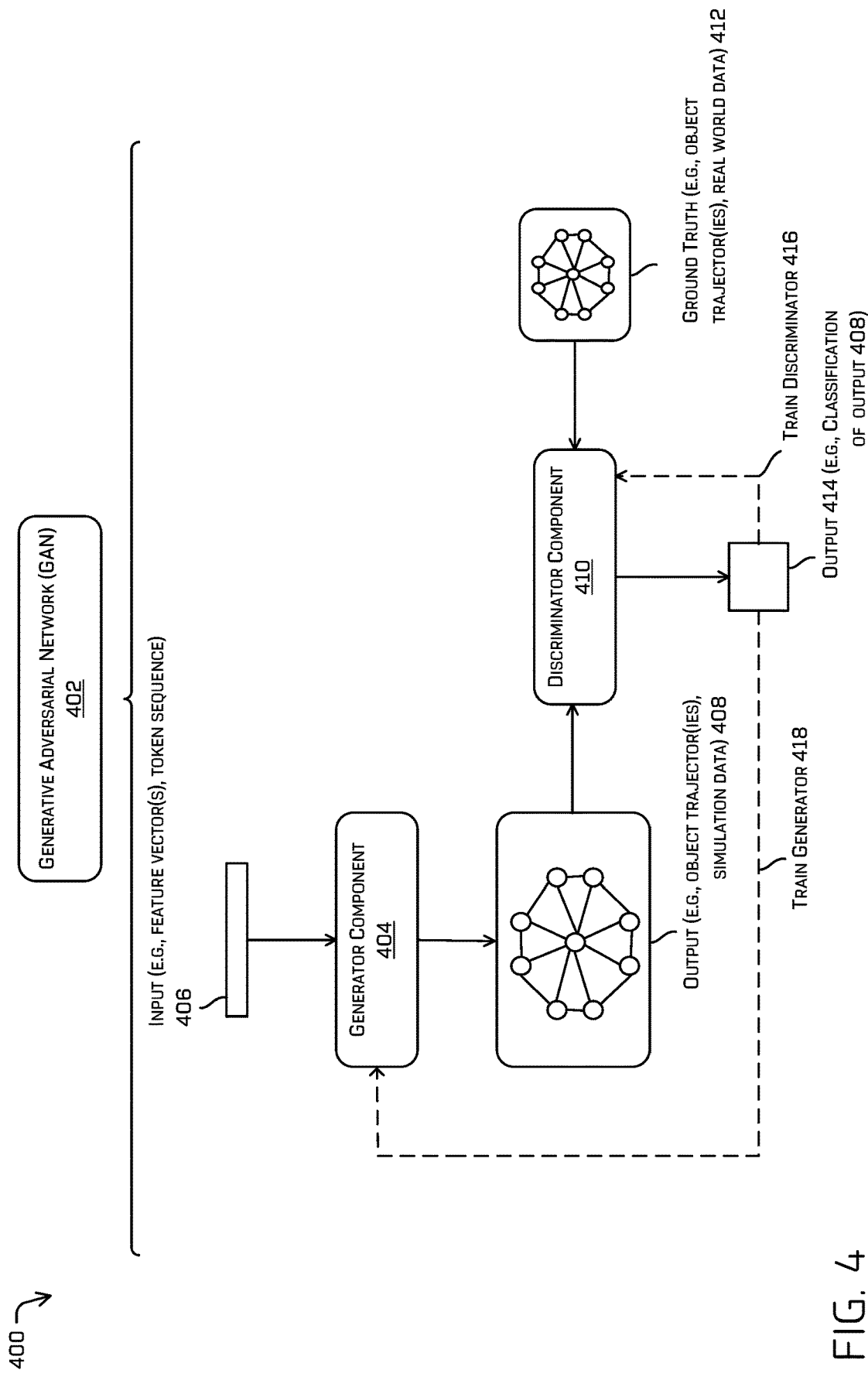
FIG. 4 illustrates an example block diagram of an example generative adversarial network implemented by a computing device to generate an object trajectory of an environment.

FIG. 4 illustrates an example block diagram 400 of an example generative adversarial network (Generative Adversarial Network (GAN) 402) implemented by a computing device to generate an object trajectory of an environment. The techniques described in the example 400 may be performed by a computing device such as the vehicle computing device(s) 804 and/or the computing device(s) 834. The GAN 402 can include at least the functionality described in relation to the machine learned model 208 of FIG. 2 and/or the decoder 318 of FIG. 3.

As illustrated in FIG. 4, the GAN 402 comprises a generator component 404 that is configured to receive an input 406 of one or more feature vectors and/or one or more token sequences usable to determine an output 408 representing one or more object trajectories and/or simulation data. The output 408 of the generator component 404 can be input into a discriminator component 410 that is configured to also receive ground truth 412 (e.g., a real world scene and/or a real-world object trajectory), and determine an output 414 indicative of a classification of the output 408 from the generator component 404 (e.g., determine whether the object trajectory or scene is real or fake). In various examples, the output 414 can be used to train the discriminator component 416 and/or train the generator component 418.

As illustrated in FIG. 4, the GAN 402 comprises the generator component 404 that is configured to receive one or more token sequences (e.g., the token sequence 206, the token sequence 316) as input and determine an object trajectory for one or more objects and/or data representing a scene usable in a simulation. In some examples, the output 408 by the generator component 404 is usable for performing a simulation over time by the vehicle computing device. In such examples, the computing device can perform a simulation with an autonomous vehicle in the scene.

In some examples, the GAN 402 can be implemented for training the codebook 308, the machine learned model 314, and/or the decoder 318. For example, the discriminator component 410 of the GAN 402 can determine whether the output 408 is from the generator component 404 or is ground truth. In various examples, the GAN 402 can be implemented to improve determinations by the generator component 404 (e.g., performing functionality of the decoder 318).

In some examples, the input 406 into the generator component 404 can comprise vector representations of an environment (e.g., the environment 100) and objects in the environment. For example, the GAN 402 can receive a first vector representation comprising one or more vectors representing static features in an environment and receive a second vector representation of an object in the environment.

As mentioned above, the output 414 can be used to train the generator component 404 to improve realism of the output 408. In some examples, the generator component 404 can receive an indication of the classification (e.g., a state of the output) and update one or more parameters used during processing. Additionally or alternatively, the generator component 404 can receive, as training data, a token sequence(s) usable to determine an object trajectory or other object state at a future time such as a position, orientation, a velocity, an acceleration etc.

In some examples, the GAN 402 can receive training data representing a top-down view of an environment, map data, and object data. In some examples, the training data can be represented as one or more vectors. The generator component 404 can determine the output 408 based at least in part on the training data. The output can represent a scene in an environment. The scene can be used in a simulation with an autonomous vehicle to test a response of a vehicle controller that controls actions performed by the autonomous vehicle. Additional details of generating simulation scenarios is described in U.S. patent application Ser. No. 16/457,679, filed on Jun. 28, 2019, entitled "Synthetic Scenario Generator Based on Attributes," and in U.S. patent application Ser. No. 16/392,094, filed on Apr. 23, 2019, entitled "Scenario Editor and Simulator," which are incorporated herein by reference in their entirety and for all purposes.

Figure 5:
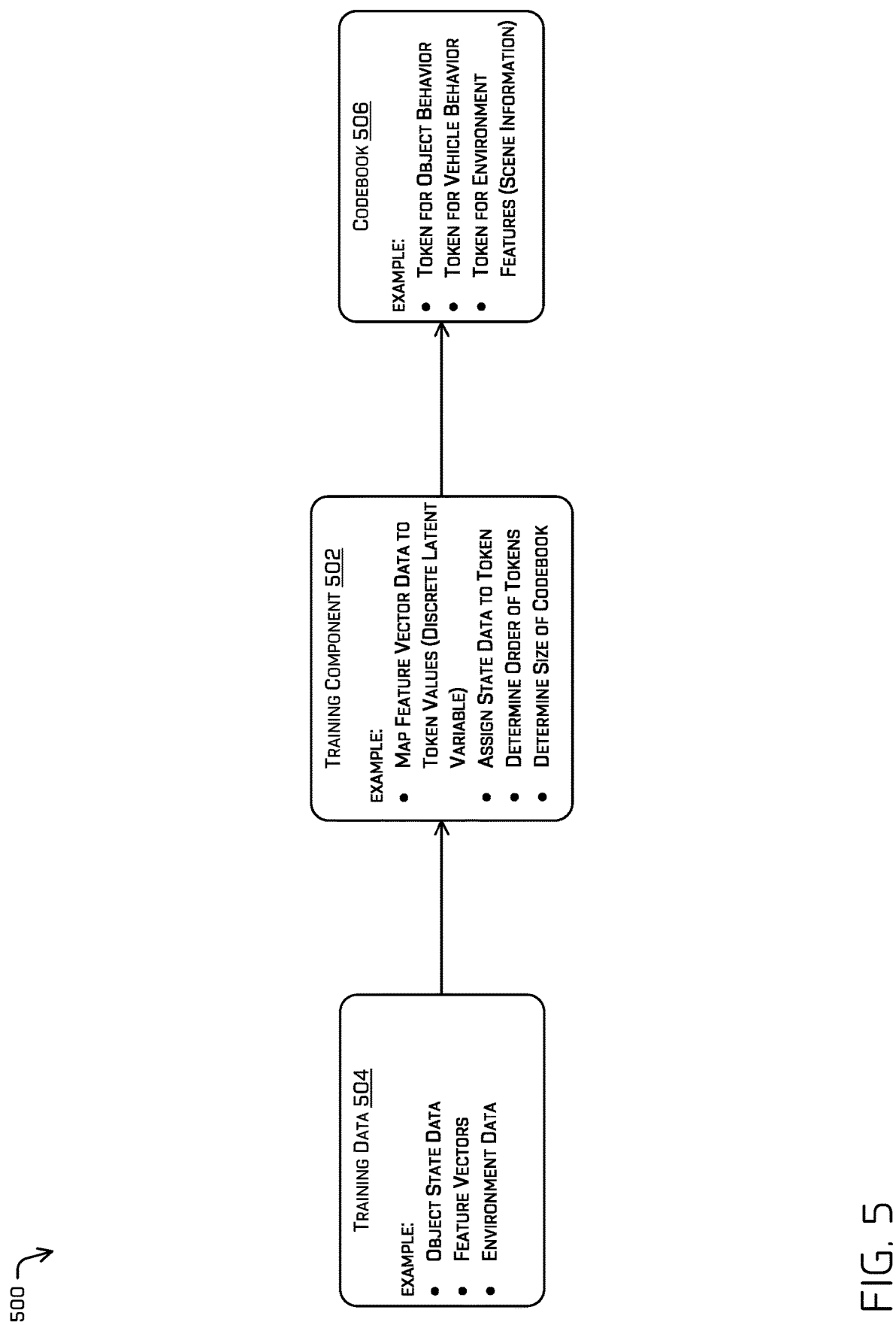
FIG. 5 depicts an example block diagram of an example training component implemented by a computing device to train an example codebook.

FIG. 5 depicts an example block diagram 500 of an example training component implemented by a computing device to train an example codebook. For example, the computing device (e.g., the vehicle computing device(s) 804 and/or the computing device(s) 834) can implement the training component 502 to process training data 504 and output a codebook 506 that includes tokens that represent object behavior, vehicle behavior, and/or features of an environment. A machine learned model (e.g., the Transformer model 204, the Transformer model 314, etc.) can receive a set of tokens from the codebook as input data and determine a token sequence for the set of tokens. In various examples, the token sequence can represent an arrangement of potential actions between a vehicle (e.g., the vehicle 102) and one or more objects in an environment. By training the codebook 506 as described herein, determinations by a machine learned model that are based on the codebook can be improved (e.g., the machine learned model that receives a set of tokens from the codebook can determine the token sequence more efficiently and accurately).

Training the codebook 506 can include the training component 502 processing the training data 504 (e.g., object state data, continuous feature vectors, discrete feature vectors, environment data, etc.) to determine a token to represent an object state, a feature vector, a static object in the environment, a dynamic object in the environment, and/or traffic signals, etc. In some examples, the training component 502 can determine a size of the codebook (e.g., a number of tokens, a size of each token, etc.) based at least in part on the training data 504. In some examples, the training component 502 can determine a mapping between token values representing discrete variables and feature vectors representing continuous variables or feature vectors representing discrete variables.

In various examples, the codebook 506 can include or utilize a list, table, or index to store associations between feature vectors and tokens. In examples that use an index, a token and a feature vector can include a same index value to indicate an association. For example, the codebook 506 can receive a token having an index value (Token 0) and "look up" or find the feature vector having a corresponding index value (Feature Vector 0). In this way, the codebook 506 can convert between the token and the feature vector depending on whether the codebook receives the token or the feature vector as input. In other examples, functionality associated with indexing or storing associations can be performed by another component, machine learned model, etc. other than the codebook 506.

The codebook 506 can, for example, convert a set of discretized feature vectors from a quantizer to tokens by identifying an index value associated with each respective discretized feature vector and mapping the index value to a corresponding token. For instance, the set of discretized feature vectors (e.g., discretized feature vectors 312) from the quantizer (e.g., the quantizer 310) can include feature vectors representing an object, an autonomous vehicle, and/or environmental features. The codebook 506 can, for example, arrange the tokens in an order similar to an order of the index values of the discretized feature vectors. In some examples, the codebook 506 can output the tokens as the token sequence 316 (e.g., independent of the machine learned model 314).

The codebook 506 can also or instead convert tokens to a set of discretized feature vectors or a set of continuous feature vectors (e.g., for processing by a component or machine learned model). For instance, the codebook 506 can identify an index value for each respective token in a token sequence, and map an index value for a feature vector (continuous or discrete) to the index value of each token. Thus, a token sequence can be converted to different types of feature vectors for use by a machine learned model (e.g., the machine learned model 208 or the decoder 318).

In some examples, information associated with a token can be compared to information associated with a feature vector and if a probability of similarity is above a threshold, the token can be associated with the feature vector as an entry in list, table, or other memory location. In some examples, mapping a token to a feature vector can include identifying a characteristic of a feature vector and another characteristic of a token (e.g., an action or a state of the vehicle associated with the feature vector and an action or a state of the vehicle associated with a token), and comparing the characteristic(s) of the vehicle associated with the feature vector to the characteristic(s) associated with the token. The training component 502 can, for example, map the feature vector to the token when a similarity of the corresponding characteristics meets or exceeds a similarity threshold.

Data associated with the entries of various mappings between tokens and feature vectors can be used after training in a variety of ways including when a machine learned model outputs a token sequence of tokens representing discrete variables, and the codebook accesses the data associated with the entries to map a discrete variable of a token to a continuous variable of a feature vector. In this way, the codebook 506 can receive data associated with a discrete representation or a continuous representation and output the other of the discrete representation or the continuous representation. In some examples, the codebook 506 can map each token in a token sequence to a respective feature vector represented by continuous variables thereby enabling a machine learned model to receive feature vectors as input rather than receiving the token sequence as discrete variables.

In some examples, the training component 502 can train the codebook 506 to convert a discrete token into a continuous feature vector (e.g., a Gaussian distribution), and vice versa. For example, tokens from the codebook can be arranged into a sequence of discrete tokens which can more easily express multimodality (e.g., provide for more diverse object interactions) compared to continuous approaches. A token can represent a high-level behavior of an object of the vehicle such as a direction of travel, an indication to turn, stop, or accelerate, just to name a few. For example, a first token can represent a vehicle traveling in a first direction at a particular velocity and a second token can represent an object facing a second direction and not moving. A token may also or instead represent a stop sign, crosswalk, a roadway, or other environmental feature. A machine learned model can arrange or cluster the tokens to represent an environment having a vehicle and different types of objects, roadways, etc.

In some examples, initializing or seeding the codebook entries (tokens) can be based at least in part on a clustering algorithm. For example, since a number of tokens in the codebook is limited, the training component 502 can use a clustering algorithm to ensure that tokens selected for entry into the codebook 506 are diverse relative to each other (e.g., have different characteristics, etc.). By clustering tokens, the training component 502 can select tokens from different areas of the cluster to maintain diversity among a type of token included in the codebook 506.

In some examples, the training data 504 may be determined based on manual annotation and/or by determining a change associated with semantic information of the position of the object. Further, detected positions over such a period of time associated with the object may be used to determine a ground truth trajectory to associate with the object. In some examples, the vehicle computing device may provide the data to a remote computing device (i.e., computing device separate from vehicle computing device) for data analysis. In such examples, the remote computing device may analyze the sensor data to determine one or more labels for images, an actual location, yaw, speed, acceleration, direction of travel, or the like of the object at the end of the set of estimated states. In some such examples, ground truth data associated with one or more of: positions, trajectories, accelerations, directions, and so may be determined (either hand labelled or determined by another machine learned model) and such ground truth data may be used to determine a trajectory of another object such as a pedestrian. In some examples, corresponding data may be input into the model to determine an output (e.g., a trajectory, and so on) and a difference between the determined output, and the actual action by the object may be used to train the model.

Figure 6:
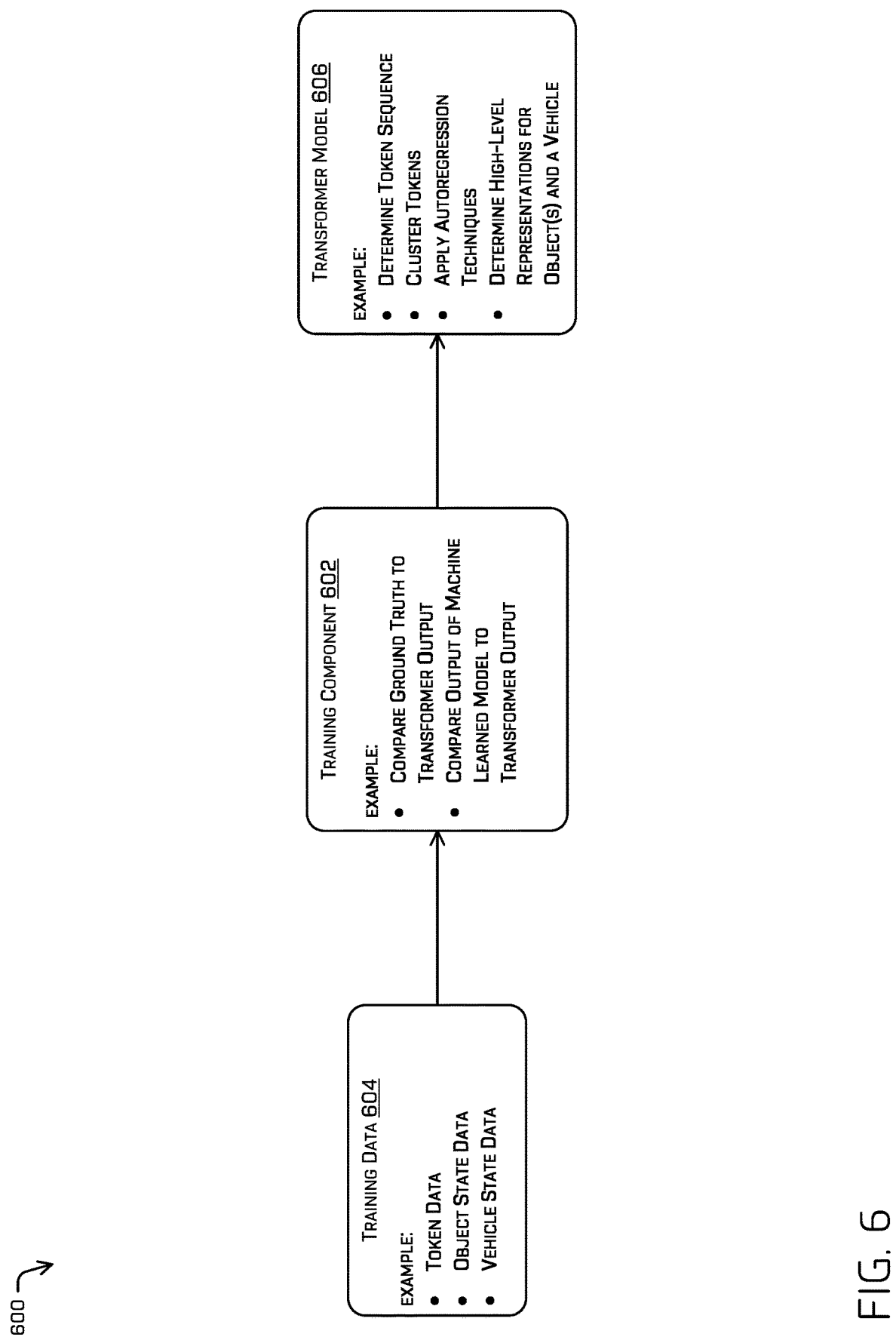
FIG. 6 depicts an example block diagram of an example training component implemented by a computing device to train an example machine learned model.

FIG. 6 depicts an example block diagram 600 of an example training component implemented by a computing device to train an example machine learned model. For example, the computing device (e.g., the vehicle computing device(s) 804 and/or the computing device(s) 834) can implement the training component 602 to process training data 604 and output a Transformer model 606 that arranges or clusters tokens from a codebook (e.g., the codebook 506). For instance, the Transformer model 606 can receive multiple tokens from the codebook as input data and determine a token sequence for the multiple tokens. In various examples, the token sequence can represent an arrangement of potential actions between a vehicle (e.g., the vehicle 102) and one or more objects (e.g., the object 108, the object 110) in an environment. By training the Transformer model 606 as described herein, determinations by the Transformer model 606 provide more accurate depictions of potential interactions between the vehicle and the object(s) in an environment. In some examples, functionality associated with the Transformer model 204 in FIG. 2 and/or the Transformer model 314 in FIG. 3 can be included in the Transformer model 606.

Training the Transformer model 606 can include the training component 602 processing the training data 604 (e.g., token data, object state data, vehicle state data, etc.) to determine a sequence of tokens to represent potential interactions between a vehicle and object(s) in an environment. In some examples, the training component 602 can arrange or cluster tokens associated with the codebook by applying an autoregressive algorithm, an attention algorithm, a self-attention algorithm, or other algorithm, to the training data 604. In some examples, the training data 604 can represent ground truth data, and the training component 602 can compare the ground truth data to an output by the Transformer model (e.g., a token sequence, a cluster of tokens, a set of tokens, etc.) as part of backpropagation. The Transformer model 606 can be trained to minimize loss associated with the output and maximize accuracy of the output to represent different scenarios with different objects.

In some examples, the training component 602 can train the Transformer model 606 based at least in part on a set of conditions that correspond to the training data 604. For example, the training data 604 can include object state data associated with one or more objects (e.g., a previous trajectory, a previous action, a previous position, a previous acceleration, or other state or behavior of the object) or vehicle state data associated with an autonomous vehicle. In various examples, different object states and/or vehicle states can correspond to a condition in the set of conditions to train the Transformer model 606. In this way, the training component 602 can train the Transformer model 606 to improve determinations of which tokens are related or otherwise depend on one another (e.g., a first token indicates a pedestrian approaching a crosswalk, a second token indicates the pedestrian is changing a heading to face the crosswalk, a third token indicates that a vehicle in the roadway is approaching the crosswalk, a fourth token indicates crosswalk signal permission, and so on). Thus, the Transformer model 606 can learn to arrange the tokens in a sequence based at least in part on determining which tokens collectively represent object actions and states.

The training component 602 can, in some examples, compare an output of a model that receives input data that is based at least in part on the token sequence. For example, the codebook can receive the token sequence and determine feature vectors that correspond to the tokens in the token sequence. The feature vectors can be input into a machine learned model (e.g., a GAN, etc.) that generates output data representing an object trajectory, scene data, or other data. In such examples, the output data from the machine learned model can be compared to the output by the Transformer model (e.g., a token sequence, a cluster of tokens, a set of tokens, etc.) to improve subsequent outputs by the Transformer model. Whether comparing ground truth data and/or output data from another model to the output of the Transformer model, the training component 602 can provide functionality to determine a fewest number of tokens that collectively represent a vehicle, one or more objects, and features of an environment as well as potential actions by the vehicle and the object(s) over time.

In some examples, the training data 604 may be determined based on manual annotation and/or by determining a change associated with semantic information of a token or a position of a token relative to another token. Further, detected positions of tokens in a set, cluster, or sequence can be considered over a period of time and may be used to determine a ground truth token sequence or token cluster that represents a real-world environment or a simulated environment. In some examples, the vehicle computing device may provide data associated with a sensor, the codebook, the Transformer, or another machine learned model to a remote computing device (i.e., computing device separate from vehicle computing device) for data analysis. In such examples, the remote computing device may analyze the data to determine one or more labels for images, an actual location, yaw, speed, acceleration, direction of travel, or the like of the object at the end of the set of estimated states. In some such examples, ground truth data associated with one or more of: positions, trajectories, accelerations, directions, and so may be determined (either hand labelled or determined by another machine learned model) and such ground truth data may be used to determine a trajectory of another object such as a vehicle. In some examples, corresponding data may be input into the model to determine an output (e.g., a trajectory, and so on) and a difference between the determined output, and the actual action by the object may be used to train the model.

Figure 7:
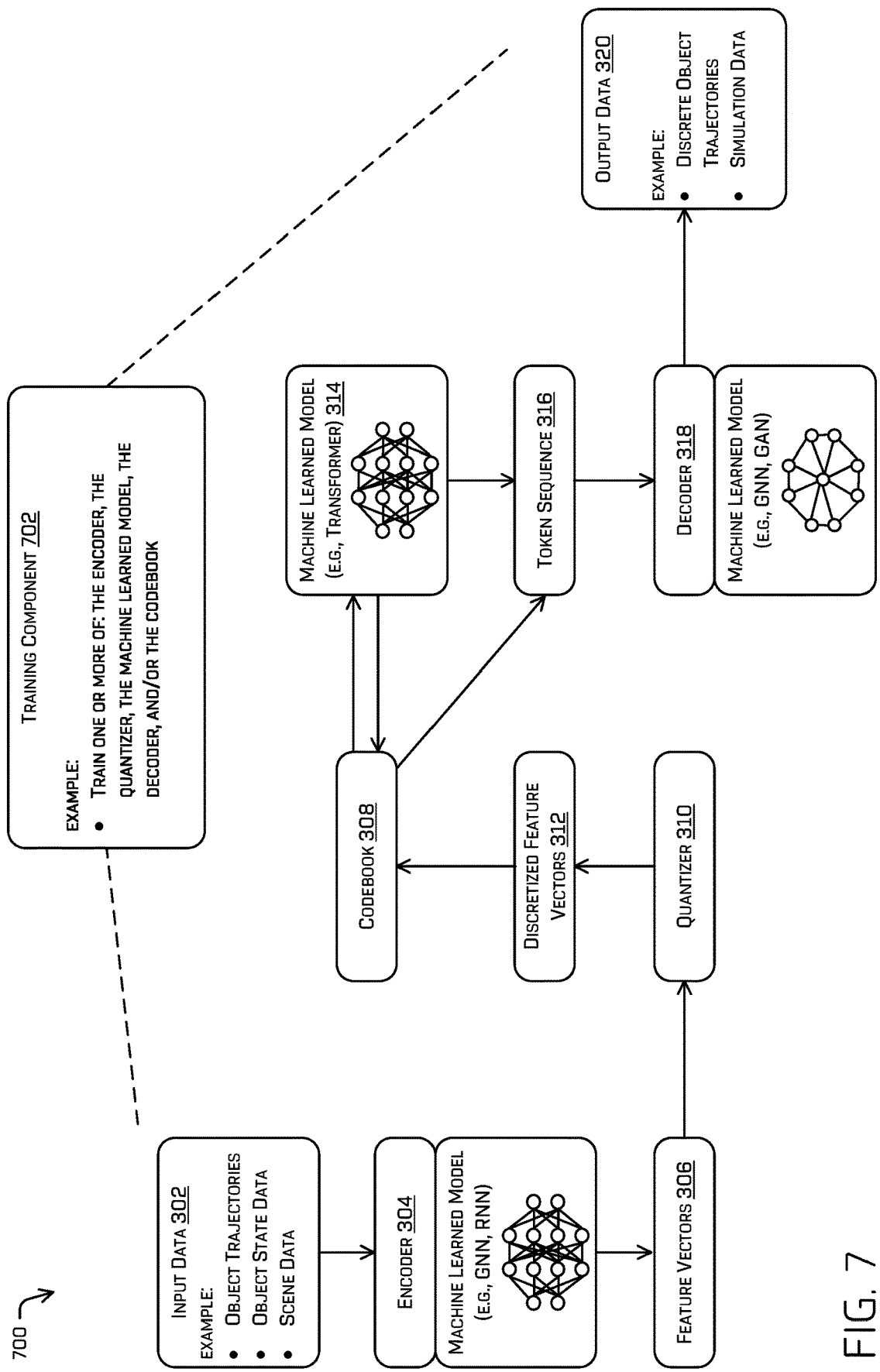
FIG. 7 depicts an example block diagram of an example training component implemented by a computing device to train one or more example machine learned models.

FIG. 7 depicts an example block diagram 700 of an example training component implemented by a computing device to train one or more example machine learned models. For example, the computing device (e.g., the vehicle computing device(s) 804 and/or the computing device(s) 834) can implement a training component 702 to train one or more of: the encoder 304 (or first machine learned model), the quantizer 310, the codebook 308, the machine learned model 314 (or second machine learned model), or the decoder 318 (or third machine learned model). In various examples, the training component 702 can determine an order for training different entities (e.g., the encoder 304, the quantizer 310, the codebook 308, the machine learned model 314, or the decoder 318) to collectively improve determinations by each of the different entities.

In some examples, the output data 320 from the decoder 318 can be used to train the codebook 308, the quantizer 310, the encoder 304, as well as the decoder 318. For example, the output data 320 can be backpropagated to the codebook 308 to improve an association between a token and a feature vector and/or to the encoder 304 to improve future feature vector predictions (e.g., by comparing the output data 320 to the input data 302 or otherwise minimizing an error). Of course, the output data 320 can also or instead be used to train the decoder 318 to improve scene generation or object trajectory prediction based on receiving the token sequence 316 (or feature vectors associated therewith). In some examples, the encoder 304, the quantizer 310, and the decoder 318 can be trained based at least in part on the output data 320. In such examples, the quantizer 310 can implement the codebook 308 to determine tokens that correspond to the discretized feature vectors 312, and cause the codebook 308 to forward the tokens to the decoder 318 as the token sequence 316. For example, the codebook 308 can using various indexing techniques to determine tokens for sending to the decoder 318 which generates the output data 320 usable to train the encoder 304, the quantizer 310, and/or the decoder 318.

In some examples, the training component 702 can train the quantizer 310 by comparing the discretized feature vectors 312 with ground truth data and adjust parameters associated with the quantizer 310 to minimize a rounding error between the feature vectors of the ground truth and the discretized feature vectors 312. In some examples, the training component 702 can determine a setting for a lambda hyperparameter, or other parameter, to balance the errors associated with training different entities (e.g., determine a rate to improve a first loss of a first component relative to also improving a second loss of a second component that is interdependent on the first loss).

By way of example and not limitation, the training component 702 can determine to train the encoder 304 to improve determinations of feature vectors to represent future intent from past history. In some examples, the training component 702 can train the machine learned model 314 after training the encoder 304, though in other examples training can include training multiple entities substantially in parallel. In some examples, the training component 702 can determine that the encoder 304 be trained prior to the machine learned model 314 since improvements by training the encoder 304 cause improvements to the machine learned model 314. Training the machine learned model 314 can include adjusting determinations by one or more self-attention layers to improve how tokens are arranged into a sequence by the one or more self-attention layers.

Although FIG. 7 shows the token sequence 316 being received by the decoder 318 from the machine learned model 314, in other examples, the token sequence 316 can be sent to the decoder 318 from the codebook 308 after the codebook 308 determines feature vectors for tokens in the token sequence. Thus, in some examples, the token sequence 316 (or associated feature vectors) usable as input data for the decoder 318 can be received from either the codebook 308 or the machine learned model 314.

Figure 8:
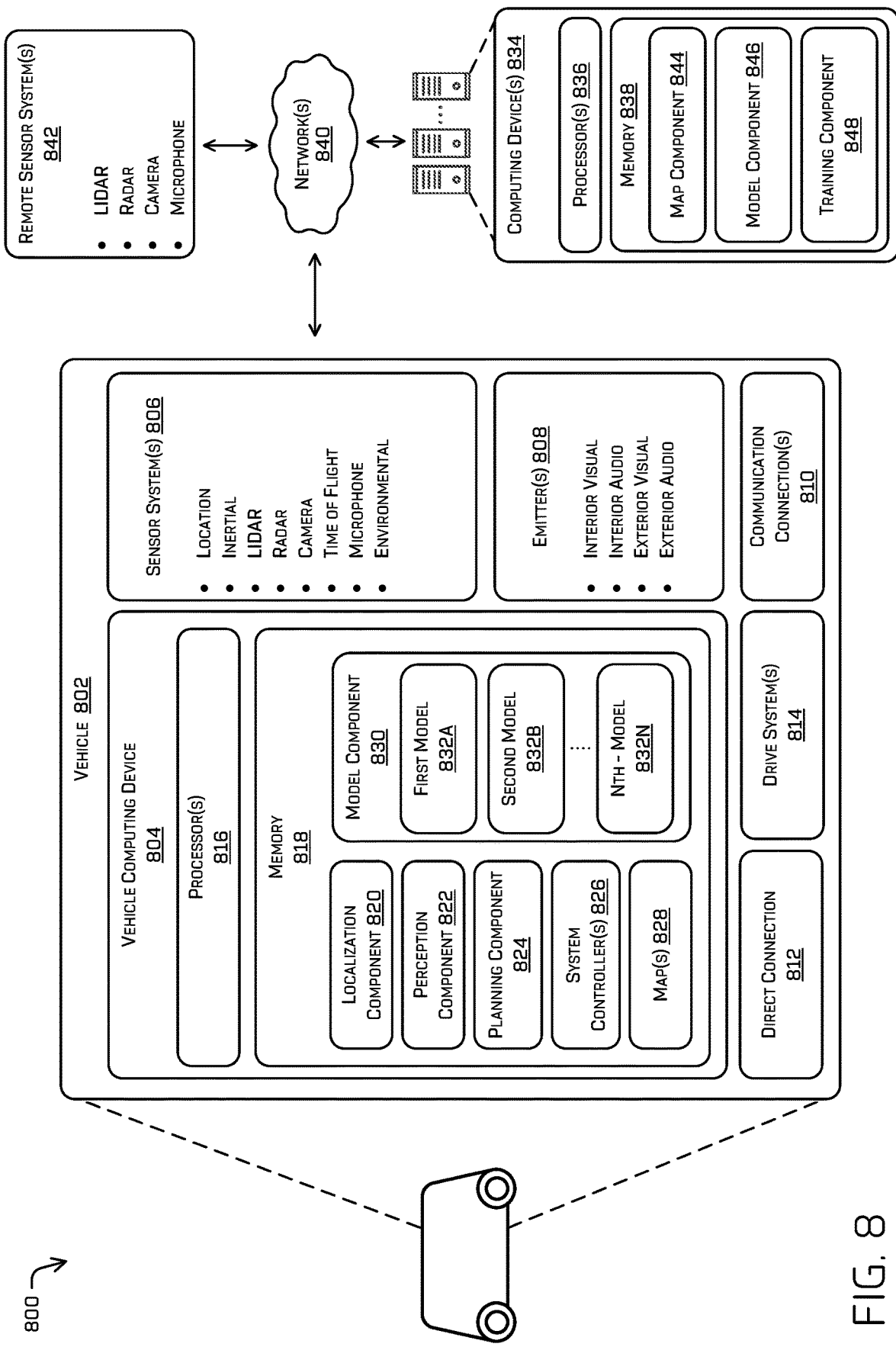
FIG. 8 is a block diagram of an example system for implementing the techniques described herein.

FIG. 8 is a block diagram of an example system 800 for implementing the techniques described herein. In at least one example, the system 800 may include a vehicle, such as vehicle 802.

The vehicle 802 may include a vehicle computing device 804, one or more sensor systems 806, one or more emitters 808, one or more communication connections 810, at least one direct connection 812, and one or more drive system(s) 814.

The vehicle computing device 804 may include one or more processors 816 and memory 818 communicatively coupled with the one or more processors 816. In the illustrated example, the vehicle 802 is an autonomous vehicle; however, the vehicle 802 could be any other type of vehicle, such as a semi-autonomous vehicle, or any other system having at least an image capture device (e.g., a camera enabled smartphone). In some instances, the autonomous vehicle 802 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 802 may be a fully or partially autonomous vehicle having any other level or classification.

In various examples, the vehicle computing device 804 may store sensor data associated with actual location of an object at the end of the set of estimated states (e.g., end of the period of time) and may use this data as training data to train one or more models. In some examples, the vehicle computing device 804 may provide the data to a remote computing device (i.e., computing device separate from vehicle computing device such as the computing device(s) 834) for data analysis. In such examples, the remote computing device(s) may analyze the sensor data to determine an actual location, velocity, direction of travel, or the like of the object at the end of the set of estimated states. Additional details of training a machine learned model based on stored sensor data by minimizing differences between actual and predicted positions and/or predicted trajectories is described in U.S. patent application Ser. No. 16/282,201, filed on Mar. 12, 2019, entitled "Motion Prediction Based on Appearance," which is incorporated herein by reference in its entirety and for all purposes.

In the illustrated example, the memory 818 of the vehicle computing device 804 stores a localization component 820, a perception component 822, a planning component 824, one or more system controllers 826, one or more maps 828, and a model component 830 including one or more model(s), such as a first model 832A, a second model 832B, up to an Nth model 832N (collectively "models 832"), where N is an integer. Though depicted in FIG. 8 as residing in the memory 818 for illustrative purposes, it is contemplated that the localization component 820, a perception component 822, a planning component 824, one or more system controllers 826, one or more maps 828, and/or the model component 830 including the model(s) 832 may additionally, or alternatively, be accessible to the vehicle 802 (e.g., stored on, or otherwise accessible by, memory remote from the vehicle 802, such as, for example, on memory 838 of a remote computing device 834). In some examples, the model(s) 832 can provide functionality associated with the prediction component 104. In some examples, the model(s) 832 can include one or more of: an encoder, a quantizer, a codebook, a decoder, a Transformer model, a machine learned model, and so on.

In at least one example, the localization component 820 may include functionality to receive data from the sensor system(s) 806 to determine a position and/or orientation of the vehicle 802 (e.g., one or more of an x-, y-, z-position, roll, pitch, or yaw). For example, the localization component 820 may include and/or request/receive a map of an environment, such as from map(s) 828 and/or map component 844, and may continuously determine a location and/or orientation of the autonomous vehicle within the map. In some instances, the localization component 820 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 820 may provide data to various components of the vehicle 802 to determine an initial position of an autonomous vehicle for determining the relevance of an object to the vehicle 802, as discussed herein.

In some instances, the perception component 822 may include functionality to perform object detection, segmentation, and/or classification. In some examples, the perception component 822 may provide processed sensor data that indicates a presence of an object (e.g., entity) that is proximate to the vehicle 802 and/or a classification of the object as an object type (e.g., car, pedestrian, cyclist, animal, building, tree, road surface, curb, sidewalk, unknown, etc.). In some examples, the perception component 822 may provide processed sensor data that indicates a presence of a stationary entity that is proximate to the vehicle 802 and/or a classification of the stationary entity as a type (e.g., building, tree, road surface, curb, sidewalk, unknown, etc.). In additional or alternative examples, the perception component 822 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In general, the planning component 824 may determine a path for the vehicle 802 to follow to traverse through an environment. For example, the planning component 824 may determine various routes and trajectories and various levels of detail. For example, the planning component 824 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 824 may generate an instruction for guiding the autonomous vehicle along at least a portion of the route from the first location to the second location. In at least one example, the planning component 824 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 802 to navigate.

In some examples, the planning component 824 may include a prediction component to generate predicted trajectories of objects (e.g., objects) in an environment and/or to generate predicted candidate trajectories for the vehicle 802. For example, a prediction component may generate one or more predicted trajectories for objects within a threshold distance from the vehicle 802. In some examples, a prediction component may measure a trace of an object and generate a trajectory for the object based on observed and predicted behavior.

In at least one example, the vehicle computing device 804 may include one or more system controllers 826, which may be configured to control steering, propulsion, braking, safety, emitters, communication, and other systems of the vehicle 802. The system controller(s) 826 may communicate with and/or control corresponding systems of the drive system(s) 814 and/or other components of the vehicle 802.

The memory 818 may further include one or more maps 828 that may be used by the vehicle 802 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 802 may be controlled based at least in part on the map(s) 828. That is, the map(s) 828 may be used in connection with the localization component 820, the perception component 822, and/or the planning component 824 to determine a location of the vehicle 802, detect objects in an environment, generate routes, determine actions and/or trajectories to navigate within an environment.

In some examples, the one or more maps 828 may be stored on a remote computing device(s) (such as the computing device(s) 834) accessible via network(s) 840. In some examples, multiple maps 828 may be stored based on, for example, a characteristic (e.g., type of entity, time of day, day of week, season of the year, etc.). Storing multiple maps 828 may have similar memory requirements, but increase the speed at which data in a map may be accessed.

As illustrated in FIG. 8, the vehicle computing device 804 may include a model component 830. The model component 830 may be configured to perform the functionality of the prediction component 104, including predicting object trajectories, scene data, and/or heat maps based at least in part on tokens associated with a codebook. In various examples, the model component 830 may receive one or more features associated with the detected object(s) from the perception component 822 and/or from the sensor system(s) 806. In some examples, the model component 830 may receive environment characteristics (e.g., environmental factors, etc.) and/or weather characteristics (e.g., weather factors such as snow, rain, ice, etc.) from the perception component 822 and/or the sensor system(s) 806. While shown separately in FIG. 8, the model component 830 could be part of the planning component 824 or other component(s) of the vehicle 802.

In various examples, the model component 830 may send predictions from the one or more models 832 that may be used by the planning component 824 to generate one or more predicted trajectories of the object (e.g., direction of travel, speed, etc.) and/or one or more predicted trajectories of the object (e.g., direction of travel, speed, etc.), such as from the prediction component thereof. In some examples, the planning component 824 may determine one or more actions (e.g., reference actions and/or sub-actions) for the vehicle 802, such as vehicle candidate trajectories. In some examples, the model component 830 may be configured to determine whether an object occupies a future position based at least in part on the one or more actions for the vehicle 802. In some examples, the model component 830 may be configured to determine the actions that are applicable to the environment, such as based on environment characteristics, weather characteristics, another object, or the like.

The model component 830 may generate sets of estimated states of the vehicle and one or more detected objects forward in the environment over a time period. The model component 830 may generate a set of estimated states for each action (e.g., reference action and/or sub-action) determined to be applicable to the environment. The sets of estimated states may include one or more estimated states, each estimated state including an estimated position of the vehicle and an estimated position of a detected object(s). In some examples, the estimated states may include estimated positions of the detected objects at an initial time (T=0) (e.g., current time).

The estimated positions may be determined based on a detected trajectory and/or predicted trajectories associated with the object. In some examples, the estimated positions may be determined based on an assumption of substantially constant velocity and/or substantially constant trajectory (e.g., little to no lateral movement of the object). In some examples, the estimated positions (and/or potential trajectories) may be based on passive and/or active prediction. In some examples, the model component 830 may utilize physics and/or geometry based techniques, machine learning, linear temporal logic, tree search methods, heat maps, and/or other techniques for determining predicted trajectories and/or estimated positions of objects.

In various examples, the estimated states may be generated periodically throughout the time period. For example, the model component 830 may generate estimated states at 0.1 second intervals throughout the time period. For another example, the model component 830 may generate estimated states at 0.05 second intervals. The estimated states may be used by the planning component 824 in determining an action for the vehicle 802 to take in an environment.

In various examples, the model component 830 may utilize machine learned techniques to predict object trajectories and scene data. In such examples, the machine learned algorithms may be trained to determine, based on sensor data and/or previous predictions by the model, that an object is likely to behave in a particular way relative to the vehicle 802 at a particular time during a set of estimated states (e.g., time period). In such examples, one or more of the vehicle 802 state (position, velocity, acceleration, trajectory, etc.) and/or the object state, classification, etc. may be input into such a machine learned model and, in turn, a trajectory prediction may be output by the model.

In various examples, characteristics associated with each object type may be used by the model component 830 to determine a trajectory, a velocity, or an acceleration associated with the object. Examples of characteristics of an object type may include, but not be limited to: a maximum longitudinal acceleration, a maximum lateral acceleration, a maximum vertical acceleration, a maximum speed, maximum change in direction for a given speed, and the like.

As can be understood, the components discussed herein (e.g., the localization component 820, the perception component 822, the planning component 824, the one or more system controllers 826, the one or more maps 828, the model component 830 including the model(s) 832 are described as divided for illustrative purposes. However, the operations performed by the various components may be combined or performed in any other component.

While examples are given in which the techniques described herein are implemented by a planning component and/or a model component of the vehicle, in some examples, some or all of the techniques described herein could be implemented by another system of the vehicle, such as a secondary safety system. Generally, such an architecture can include a first computing device to control the vehicle 802 and a secondary safety system that operates on the vehicle 802 to validate operation of the primary system and to control the vehicle 802 to avoid collisions.

In some instances, aspects of some or all of the components discussed herein may include any models, techniques, and/or machine learned techniques. For example, in some instances, the components in the memory 818 (and the memory 838, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, backpropagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 806 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 806 may include multiple instances of each of these or other types of sensors. For instance, the lidar sensors may include individual lidar sensors located at the corners, front, back, sides, and/or top of the vehicle 802. As another example, the camera sensors may include multiple cameras disposed at various locations about the exterior and/or interior of the vehicle 802. The sensor system(s) 806 may provide input to the vehicle computing device 804. Additionally, or in the alternative, the sensor system(s) 806 may send sensor data, via the one or more networks 840, to the one or more computing device(s) 834 at a particular frequency, after a lapse of a predetermined period of time, in near real-time, etc.

The vehicle 802 may also include one or more emitters 808 for emitting light and/or sound. The emitters 808 may include interior audio and visual emitters to communicate with passengers of the vehicle 802. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 808 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 802 may also include one or more communication connections 810 that enable communication between the vehicle 802 and one or more other local or remote computing device(s). For instance, the communication connection(s) 810 may facilitate communication with other local computing device(s) on the vehicle 802 and/or the drive system(s) 814. Also, the communication connection(s) 810 may allow the vehicle to communicate with other nearby computing device(s) (e.g., remote computing device 834, other nearby vehicles, etc.) and/or one or more remote sensor system(s) 842 for receiving sensor data. The communications connection(s) 810 also enable the vehicle 802 to communicate with a remote teleoperations computing device or other remote services.

The communications connection(s) 810 may include physical and/or logical interfaces for connecting the vehicle computing device 804 to another computing device or a network, such as network(s) 840. For example, the communications connection(s) 810 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 802 may include one or more drive systems 814. In some examples, the vehicle 802 may have a single drive system 814. In at least one example, if the vehicle 802 has multiple drive systems 814, individual drive systems 814 may be positioned on opposite ends of the vehicle 802 (e.g., the front and the rear, etc.). In at least one example, the drive system(s) 814 may include one or more sensor systems to detect conditions of the drive system(s) 814 and/or the surroundings of the vehicle 802. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 814. In some cases, the sensor system(s) on the drive system(s) 814 may overlap or supplement corresponding systems of the vehicle 802 (e.g., sensor system(s) 806).

The drive system(s) 814 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 814 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 814. Furthermore, the drive system(s) 814 may also include one or more communication connection(s) that enable communication by the respective drive module with one or more other local or remote computing device(s).

In at least one example, the direct connection 812 may provide a physical interface to couple the one or more drive system(s) 814 with the body of the vehicle 802. For example, the direct connection 812 may allow the transfer of energy, fluids, air, data, etc. between the drive system(s) 814 and the vehicle. In some instances, the direct connection 812 may further releasably secure the drive system(s) 814 to the body of the vehicle 802.

In at least one example, the localization component 820, the perception component 822, the planning component 824, the one or more system controllers 826, the one or more maps 828, and the model component 830, may process sensor data, as described above, and may send their respective outputs, over the one or more network(s) 840, to the computing device(s) 834. In at least one example, the localization component 820, the perception component 822, the planning component 824, the one or more system controllers 826, the one or more maps 828, and the model component 830 may send their respective outputs to the remote computing device(s) 834 at a particular frequency, after a lapse of a predetermined period of time, in near real-time, etc.

In some examples, the vehicle 802 may send sensor data to the computing device(s) 834 via the network(s) 840. In some examples, the vehicle 802 may receive sensor data from the computing device(s) 834 and/or remote sensor system(s) 842 via the network(s) 840. The sensor data may include raw sensor data and/or processed sensor data and/or representations of sensor data. In some examples, the sensor data (raw or processed) may be sent and/or received as one or more log files.

The computing device(s) 834 may include processor(s) 836 and a memory 838 storing the map component 844, a sensor data processing component 846, and a training component 848. In some examples, the map component 844 may include functionality to generate maps of various resolutions. In such examples, the map component 844 may send one or more maps to the vehicle computing device 804 for navigational purposes. In various examples, the sensor data processing component 846 may be configured to receive data from one or more remote sensors, such as sensor system(s) 806 and/or remote sensor system(s) 842. In some examples, the sensor data processing component 846 may be configured to process the data and send processed sensor data to the vehicle computing device 804, such as for use by the model component 830 (e.g., the model(s) 832). In some examples, the sensor data processing component 846 may be configured to send raw sensor data to the vehicle computing device 804.

In some instances, the training component 848 (e.g., trained in accordance with the techniques discussed in FIG. 4) can include functionality to train a machine learning model to output probabilities for whether an occluded region is free of any objects or whether the occluded region is occupied by a static obstacle or a dynamic object. For example, the training component 848 can receive sensor data that represents an object traversing through an environment for a period of time, such as 0.1 milliseconds, 1 second, 3, seconds, 5 seconds, 7 seconds, and the like. At least a portion of the sensor data can be used as an input to train the machine learning model.

In some instances, the training component 848 may be executed by the processor(s) 836 to train a machine learning model based on training data. The training data may include a wide variety of data, such as sensor data, audio data, image data, map data, inertia data, vehicle state data, historical data (log data), or a combination thereof, that is associated with a value (e.g., a desired classification, inference, prediction, etc.). Such values may generally be referred to as a "ground truth." To illustrate, the training data may be used for determining risk associated with occluded regions and, as such, may include data representing an environment that is captured by an autonomous vehicle and that is associated with one or more classifications or determinations. In some examples, such a classification may be based on user input (e.g., user input indicating that the data depicts a specific risk) or may be based on the output of another machine learned model. In some examples, such labeled classifications (or more generally, the labeled output associated with training data) may be referred to as ground truth.

In some instances, the training component 848 can include functionality to train a machine learning model to output classification values. For example, the training component 848 can receive data that represents labelled collision data (e.g. publicly available data, sensor data, and/or a combination thereof). At least a portion of the data can be used as an input to train the machine learning model. Thus, by providing data where the vehicle traverses an environment, the training component 848 can be trained to output occluded value(s) associated with objects and/or occluded region(s), as discussed herein.

In some examples, the training component 848 can include training data that has been generated by a simulator. For example, simulated training data can represent examples where a vehicle collides with an object in an environment or nearly collides with an object in an environment, to provide additional training examples.

The processor(s) 816 of the vehicle 802 and the processor(s) 836 of the computing device(s) 834 may be any suitable processor capable of executing instructions to process data and perform operations as described herein. By way of example and not limitation, the processor(s) 816 and 836 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 818 and memory 838 are examples of non-transitory computer-readable media. The memory 818 and memory 838 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 8 is illustrated as a distributed system, in alternative examples, components of the vehicle 802 may be associated with the computing device(s) 834 and/or components of the computing device(s) 834 may be associated with the vehicle 802. That is, the vehicle 802 may perform one or more of the functions associated with the computing device(s) 834, and vice versa.

Figure 9:
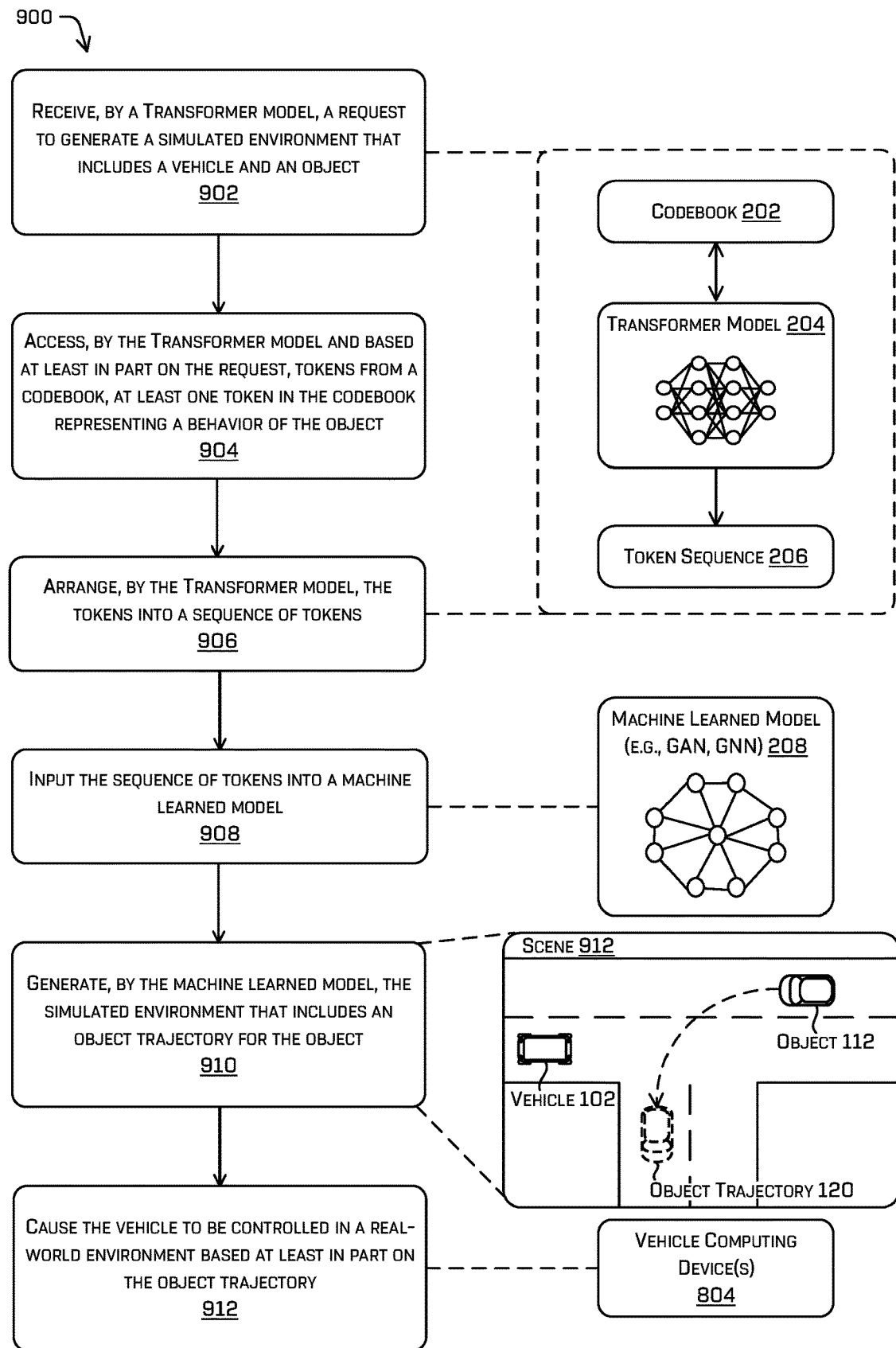
FIG. 9 is a flowchart depicting an example process for determining an object trajectory using one or more example models.

FIG. 9 is a flowchart depicting an example process 900 for determining an object trajectory using one or more example models. Some or all of the process 900 may be performed by one or more components in FIG. 8, as described herein. For example, some or all of process 900 may be performed by the vehicle computing device 804.

At operation 902, the process may include receiving, by a Transformer model, a request to generate a simulated environment that includes a vehicle and an object. For example, the vehicle computing device 804 can initiate a simulation or otherwise send an instruction requesting that the model component 830 generate object trajectories for one or more objects in an environment of a vehicle. In some examples, the Transformer model (e.g., the Transformer model 204) can receive tokens from the codebook 202. In various examples, the tokens can be based at least in part on sensor data from the perception component 822 and map data from the map(s) 828 and/or the map component 844. The vehicle computing device may be configured to receive sensor data representing one or more objects in an environment (e.g., vehicle 110). In some examples, the vehicle computing device may be configured to detect dynamic objects and/or static objects and combine the associated sensor data with map data. In some examples, the map data may represent fixed features of an environment including but not limited to crosswalks, traffic signals, school zones, and the like. The model component 830 may also or instead receive object state data such as position data, orientation data, heading data, velocity data, speed data, acceleration data, yaw rate data, or turning rate data associated with the object.

At operation 904, the process may include accessing, by the Transformer model and based at least in part on the request, tokens from a codebook, at least one token in the codebook representing a behavior of the object. For example, the Transformer model 204 can retrieve or otherwise receive tokens from the codebook 202 based at least in part on receiving the request.

At operation 906, the process may include arranging, by the Transformer model, the tokens into a sequence of tokens. For instance, the Transformer model 204 can output the token sequence 206 (or feature vector associated with the token sequence). In some examples, the Transformer model 204 can apply an autoregressive technique and/or implement a self-attention layer to sample tokens from the codebook or to arrange the tokens in a particular order relative to one another.

At operation 908, the process may include inputting the sequence of tokens into a machine learned model. For example, the Transformer model 204 can output the token sequence 206 which can be input into the machine learned model 208 (e.g., a GAN, a GNN, another Transformer model, etc.). In some examples, the codebook 202 can map feature vectors to the tokens in the token sequence 206 and send the feature vectors (instead of or in addition to the token sequence 206) to the machine learned model 208.

At operation 910, the process may include generating, by the machine learned model, the simulated environment that includes an object trajectory for the object. For instance, the operation can include the machine learned model 208 using the input from the codebook 202 (e.g., feature vectors) and/or the token sequence 206 from the Transformer model 204 to determine one or more object trajectories for one or more objects in a simulated environment (e.g., the object trajectory 116). In some examples, the machine learned model 208 can output the predicted trajectory associated with the object based at least in part on determining a relationship between one feature vector relative to another feature vector or interactions between tokens in the token sequence. For example, the machine learned model 208 can validate or modify associations between feature vectors determined by the Transformer model 204 and determine scene data that includes one or more object trajectories for one or more objects in the scene.

At operation 912, the process may include causing the vehicle to be controlled in a real-world environment based at least in part on the object trajectory. For example, the operation may include sending the output of the machine learned model to a vehicle computing device of the vehicle. In various examples, the vehicle computing device is configured to determine a trajectory for the vehicle (e.g., trajectory 118 for the vehicle 102) based at least in part on the output. For example, an output from the model component 830 can be sent to the perception component 822 or the planning component 824, just to name a few. In various examples, the vehicle computing device may control operation of the vehicle, such as the planning component 824. The vehicle computing device may determine a vehicle trajectory based at least in part on the object trajectory(ies) thereby improving vehicle safety by planning for the possibility that the object may intersect with the vehicle in the future. Additional details of controlling a vehicle using one or more outputs from one or more modes are discussed throughout the disclosure.

Figure 10:
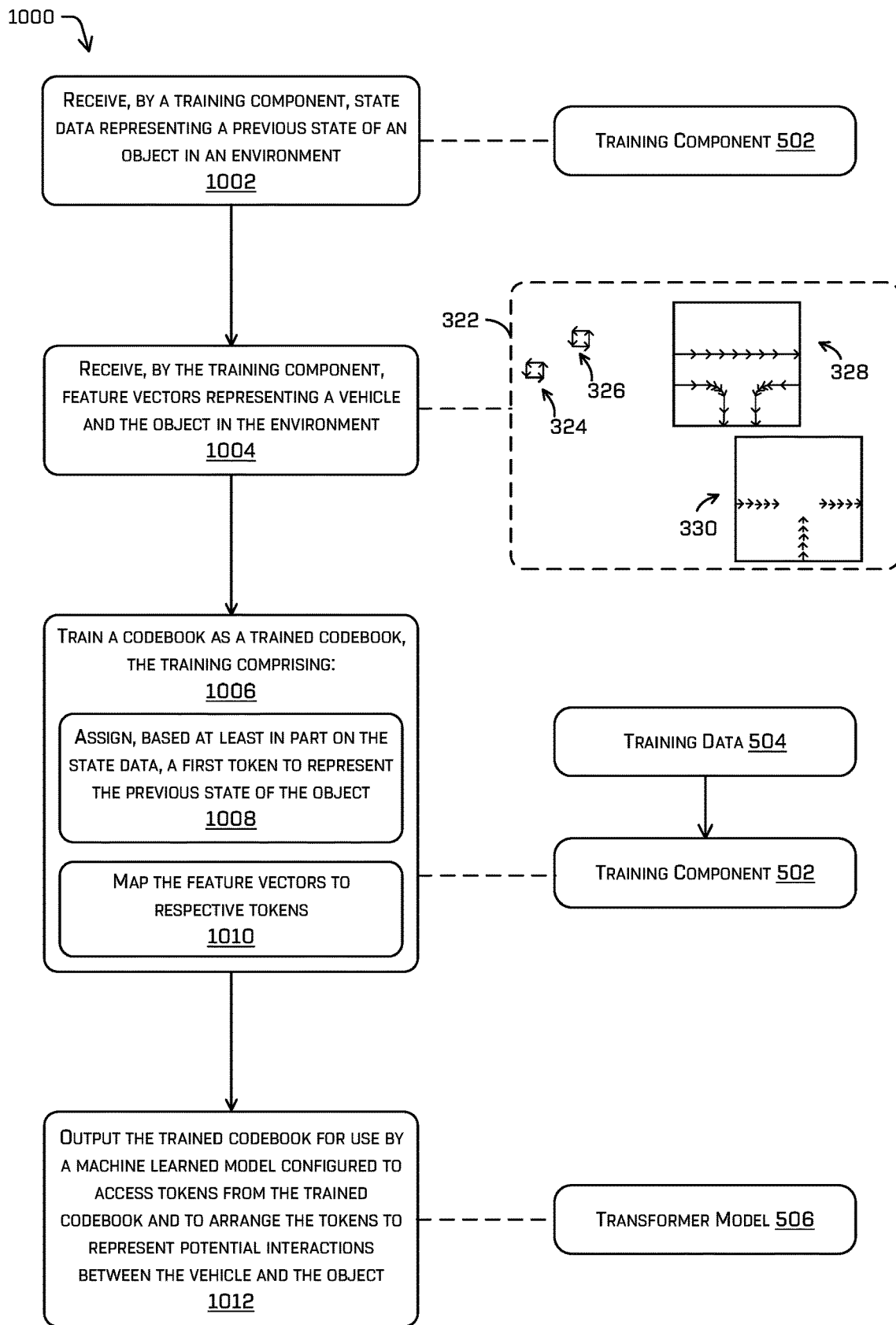
FIG. 10 is flowchart depicting an example process for training a codebook using an example training component.

FIG. 10 is flowchart depicting an example process 1000 for training a codebook using an example training component. Some or all of the process 1000 may be performed by one or more components in FIG. 8, as described herein. For example, some or all of process 1000 may be performed by the training component 502, the training component 702, and/or the training component 848.

At operation 1002, the process may include receiving, by a training component, state data representing a previous state of an object in an environment. For example, the training component 502 can receive vectorized data representing an object, a building, an intersection, a crosswalk, and the like (e.g., the vector representation 322). The vehicle computing device may be configured to receive object state data representing position data, orientation data, heading data, velocity data, speed data, acceleration data, yaw rate data, or turning rate data associated with the object at one or more previous times. In some examples, map data can be received that represents fixed features of the environment including but not limited to crosswalks, traffic signals, school zones, and the like.

At operation 1004, the process may include receiving, by the training component, feature vectors representing a vehicle and the object in the environment. For example, the training component 502 can receive vectorized data representing a vehicle state data such as position data, orientation data, heading data, velocity data, speed data, acceleration data, yaw rate data, or turning rate data associated with the vehicle 102.

At operation 1006, the process may include training a codebook as a trained codebook, the training comprising at operation 1008 assigning, based at least in part on the state data, a first token to represent the previous state of the object. For example, the training component 502 can be configured to assign, generate, or otherwise determine one or more tokens to represent different previous states of the object (e.g., a heading, a speed, a position, etc.). The training component 502 can also or instead determine tokens to represent states of the vehicle 102 based at least in part on the vehicle state data associated with a previous, current, or future time.

At operation 1010, the process may include mapping the feature vectors to respective tokens. For example, the training component 502 can determine a list or table that associates a feature vector (discrete or continuous) with a token (discrete). The training component 502 can cause the codebook to store mapping data associated with a mapping between a feature vector and a token in a memory. The mapping data can be accessed by the codebook to identify feature vector(s) to represent each token in a token sequence or to identify a token to represent a feature vector.

At operation 1012, the process may include outputting the trained codebook for use by a machine learned model configured to access tokens from the trained codebook and to arrange the tokens to represent potential interactions between the vehicle and the object. For example, the machine learned model 208 can access tokens from the codebook 506 and arrange the tokens in a sequence based at least in part on applying one or more algorithms (e.g., a self-attention algorithm, etc.). An output of the machine learned model 208 can be used by a vehicle computing device that is configured to control the autonomous vehicle (e.g., determine a trajectory, control a drive system, a brake system, and so on). In some examples, the trained codebook can include a number of tokens determined based at least in part on a hyperparameter specifying a total number of tokens to include in the trained codebook.

In various examples, the training component 502 can determine a number of tokens to include in the codebook. For example, the training component 502 can determine a minimum number of tokens and/or a maximum number of tokens for including in the codebook. In some examples, the training component 502 can receive training data indicating accuracy of determinations using different numbers of tokens in a token sequence to accurately represent a scene or predict an object trajectory. In some examples, the training component 502 can output the trained codebook with consideration to a number of tokens, a length of a token sequence, and/or a size of a token to make efficient use of computational resources.

FIGS. 9 and 10 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes. In some embodiments, one or more operations of the method may be omitted entirely. By way of example and not limitation, operations 904, 906, 908, and 910 may be performed without operations 902 and 912 and only one of operations 1008, 1010, 1012, and 1014 may be performed in relation to operation 1006. Moreover, the methods described herein can be combined in whole or in part with each other or with other methods.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the one or more processors to perform actions comprising: receiving, by a transformer model, a request to generate a simulated environment that includes a vehicle and an object; accessing, by the transformer model and based at least in part on the request, tokens from a codebook, at least one token in the codebook representing a behavior of the object; arranging, by the transformer model, the tokens into a sequence of tokens; inputting the sequence of tokens into a machine learned model; generating, by the machine learned model, the simulated environment that includes an object trajectory for the object; and causing the vehicle to be controlled in a real-world environment based at least in part on the object trajectory.

B: The system of paragraph A, the actions further comprising: training the transformer model based at least in part on a set of conditions, at least one condition of the set of conditions comprising a previous action, a previous position, or a previous acceleration of the object.

C: The system of paragraph A or B, wherein: the tokens in the codebook represent discrete latent variables.

D: The system of any of paragraphs A-C, wherein: a first token of the tokens represents an action for the vehicle in the simulated environment to take at a future time, and a second token of the tokens represents a feature of the object in the real-world environment or the simulated environment.

E: The system of paragraph D, wherein: the first token represents one of: a yield action, a drive straight action, a left turn action, a right turn action, a brake action, an acceleration action, a steering action, or a lane change action, and the second token represents a position, a heading, or an acceleration of the object.

F: A method comprising: receiving sensor data from a sensor associated with a vehicle; receiving, by a first machine learned model, a set of tokens from a codebook, at least one token in the codebook representing a potential characteristic of an object in an environment, wherein the potential characteristic of the object represents a state or an action; inputting the set of tokens into a second machine learned model; determining, by the second machine learned model and based at least in part on the set of tokens, an object trajectory for the object to follow in the environment; and causing the vehicle to be controlled in the environment based at least in part on the object trajectory.

G: The method of paragraph F, wherein: an order of the set of tokens is based at least in part on an autoregressive algorithm; the first machine learned model is a transformer model, and the second machine learned model comprises at least one of a Generative Adversarial Network (GAN), a Graph Neural Network (GNN), a Convolutional Neural Network (CNN), a Recurrent Neural Network (RNN), or another transformer model.

H: The method of paragraph F or G, wherein: the first machine learned model comprises a transformer model, and the transformer model is trained based at least in part on a set of conditions, at least one condition of the set of conditions comprising a previous action, a previous position, or a previous acceleration of the object.

I: The method of any of paragraphs F-H, wherein: the tokens in the codebook represent discrete latent variables.

J: The method of any of paragraphs F-I, wherein: a first token of the tokens represents an action for a vehicle in the environment to take at a future time, and a second token of the tokens represents a feature of the object in the environment.

K: The method of paragraph J, wherein: the first token represents one of: a yield action, a drive straight action, a left turn action, a right turn action, a brake action, an acceleration action, a steering action, or a lane change action, and the second token represents a position, a heading, or an acceleration of the object.

L: The method of any of paragraphs F-K, wherein: the codebook comprises a fixed number of tokens, and determining the set of tokens is further based at least in part on the fixed number of tokens in the codebook.

M: The method of any of paragraphs F-L, wherein the set of tokens represent discrete latent variables, and further comprising: mapping the discrete latent variables associated with the set of tokens to continuous variables associated with feature vectors, wherein inputting the set of tokens into the second machine learned model comprises inputting the continuous variables associated with the feature vectors, and determining, by the second machine learned model, the object trajectory is based at least in part on the continuous variables associated with the feature vectors.

N: The method of any of paragraphs F-M, wherein: the first machine learned model implements an autoregressive algorithm to sample the tokens from the codebook, the first machine learned model comprises one or more self-attention layers configured to determine scores for at least some of the tokens from the codebook, a first score indicating a dependency between a first token and a second token and a second score indicating a dependency between a third token and one of: the first token, the second token, or a fourth token, and determining the set of tokens is further based at least in part on the one or more self-attention layers determining the scores.

O: The method of any of paragraphs F-N, wherein: the object is a first object, another token in the codebook represents a potential action of a second object in the environment, and the set of tokens represents a potential interaction between the second object and the first object.

P: The method of any of paragraphs F-O, wherein: the environment is a simulated environment, another token in the codebook represents a feature of the simulated environment, and further comprising: determining, by the second machine learned model and based at least in part on the set of tokens, scene data for testing or verifying a scenario in the simulated environment.

Q: One or more non-transitory computer-readable media storing instructions that, when executed, cause one or more processors to perform actions comprising: receiving sensor data from a sensor associated with a vehicle; receiving, by a first machine learned model, a set of tokens from a codebook, at least one token in the codebook representing a potential characteristic of an object in an environment. wherein the potential characteristic of the object represents a state or an action; inputting the set of tokens into a second machine learned model; determining, by the second machine learned model and based at least in part on the set of tokens, an object trajectory for the object to follow in the environment; and causing the vehicle to be controlled in the environment based at least in part on the object trajectory.

R: The one or more non-transitory computer-readable media of paragraph Q, wherein: an order of the set of tokens is based at least in part on an autoregressive algorithm; the first machine learned model is a transformer model, and the second machine learned model comprises at least one of a Generative Adversarial Network (GAN), a Graph Neural Network (GNN), a Convolutional Neural Network (CNN), a Recurrent Neural Network (RNN), or another transformer model.

S: The one or more non-transitory computer-readable media of paragraph Q or R, wherein: the first machine learned model comprises a transformer model, and the transformer model is trained based at least in part on a set of conditions, at least one condition of the set of conditions comprising a previous action, a previous position, or a previous acceleration of the object.

T: The one or more non-transitory computer-readable media of any of paragraphs Q-S, wherein: the tokens in the codebook represent discrete latent variables.

U: A system comprising: one or more processors; and one or more non-transitory computer-readable media storing instructions executable by the one or more processors, wherein the instructions, when executed, cause the one or more processors to perform actions comprising: receiving, by a training component, state data representing a previous state of an object in an environment; receiving, by the training component, feature vectors representing a vehicle and the object in the environment; training a codebook as a trained codebook, the training comprising: assigning, based at least in part on the state data, a first token to represent the previous state of the object; and mapping the feature vectors to respective tokens; and outputting the trained codebook for use by a machine learned model configured to access tokens from the trained codebook and to arrange the tokens to represent potential interactions between the vehicle and the object, wherein the trained codebook includes a determined number of tokens.

V: The system of paragraph U, wherein the machine learned model is a transformer model, and the actions further comprising: causing the transformer model to arrange the tokens based at least in part on the number of tokens and an order of the tokens.

W: The system of paragraph U or V, wherein: the feature vectors represent continuous variables, the tokens represent discrete latent variables, and mapping the feature vectors to respective tokens comprises mapping the continuous variables associated with the feature vectors to discrete latent variables associated with the tokens.

X: The system of any of paragraphs U-W, wherein training the codebook further comprises: assigning a second token to represent a characteristic of the vehicle; and assigning a third token to represent a feature of the environment; wherein the machine learned model represents the potential interactions between the vehicle and the object based at least in part on the first token, the second token, and the third token.

Y: The system of any of paragraphs U-X, the actions further comprising: receiving, by the training component, environmental data representing a feature of the environment, wherein training the codebook further comprises assigning a second token to represent the feature of the environment, and the codebook is usable by the machine learned model to cause generation of a scene with the feature in the environment.

Z: A method comprising: receiving, by a training component, state data representing a previous state of an object or a vehicle in an environment; receiving, by the training component, feature vectors representing the vehicle and the object in the environment; training a codebook to output a trained codebook, the training comprising: assigning, based at least in part on the state data, a first token to represent the previous state of the object; and mapping the feature vectors to respective tokens; and outputting the trained codebook for use by a machine learned model configured to access tokens from the trained codebook and to arrange the tokens to represent potential interactions between the vehicle and the object.

AA: The method of paragraph Z, further comprising: determining a number of tokens to include in the codebook; and determining an order of the tokens.

AB: The method of paragraph Z or AA, further comprising: causing the machine learned model to arrange the tokens based at least in part on a number of tokens and an order of the tokens.

AC: The method of any of paragraphs Z-AB, wherein: the feature vectors represent continuous variables, the tokens represent discrete latent variables, and mapping the feature vectors to respective tokens comprises mapping the continuous variables associated with the feature vectors to discrete latent variables associated with the tokens.

AD: The method of any of paragraphs Z-AC, wherein training the codebook further comprises: assigning a second token to represent a characteristic of the vehicle; and assigning a third token to represent a feature of the environment; wherein the machine learned model represents the potential interactions between the vehicle and the object based at least in part on the first token, the second token, and the third token.

AE: The method of any of paragraphs Z-AD, further comprising: receiving, by the training component, environmental data representing a feature of the environment, wherein training the codebook further comprises assigning a second token to represent the feature of the environment, and the codebook is usable by the machine learned model to cause generation of a scene with the feature in the environment.

AF: The method of any of paragraphs Z-AE, wherein the state data representing the previous state of the object or the vehicle comprising one or more of: position data, orientation data, heading data, velocity data, speed data, acceleration data, yaw rate data, or turning rate data.

AG: The method of any of paragraphs Z-AF, further comprising: inputting image data into an encoder; and outputting, by the encode, the feature vectors, wherein receiving the feature vectors by the training component comprises receiving the feature vectors from the encoder.

AH: The method of any of paragraphs Z-AG, wherein: the feature vectors represent a characteristic of the vehicle and a characteristic of the object in the environment.

AI: The method of any of paragraphs Z-AH, wherein mapping the feature vectors to respective tokens comprises: identifying an action or a state of the vehicle associated with a first feature vector of the feature vectors; comparing a characteristic of the vehicle associated with the first feature vector to a characteristic associated with one or more of the tokens.

AJ: One or more non-transitory computer-readable media storing instructions that, when executed, cause one or more processors to perform actions comprising: receiving, by a training component, state data representing a previous state of an object or a vehicle in an environment; receiving, by the training component, feature vectors representing the vehicle and the object in the environment; training a codebook to output a trained codebook, the training comprising: assigning, based at least in part on the state data, a first token to represent the previous state of the object; mapping the feature vectors to respective tokens; and outputting the trained codebook for use by a machine learned model configured to access tokens from the trained codebook and to arrange the tokens to represent potential interactions between the vehicle and the object.

AK: The one or more non-transitory computer-readable media of paragraph AJ, wherein the machine learned model is a first machine learned model, and the actions further comprising: causing the machine learned model to arrange the tokens based at least in part on a number of tokens and an order of the tokens.

AL: The one or more non-transitory computer-readable media of paragraph AJ or AK, wherein: the feature vectors represent continuous variables, the tokens represent discrete latent variables, and mapping the feature vectors to respective tokens comprises mapping the continuous variables associated with the feature vectors to discrete latent variables associated with the tokens.

AM: The one or more non-transitory computer-readable media of any of paragraphs AJ-AL, wherein training the codebook further comprises: assigning a second token to represent a characteristic of the vehicle; and assigning a third token to represent a feature of the environment; wherein the machine learned model represents the potential interactions between the vehicle and the object based at least in part on the first token, the second token, and the third token.

AN: The one or more non-transitory computer-readable media of any of paragraphs AJ-AM, the actions further comprising: receiving, by the training component, environmental data representing a feature of the environment, wherein training the codebook further comprises assigning a second token to represent the feature of the environment, and the codebook is usable by the machine learned model to cause generation of a scene with the feature in the environment.

While the example clauses described below are described with respect to one particular implementation, it should be understood that, in the context of this document, the content of the example clauses can also be implemented via a method, device, system, computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the one or more processors to perform actions comprising:
receiving, by a training component, state data representing a previous state of an object in an environment;
receiving, by the training component, feature vectors representing a vehicle and the object in the environment;
training a codebook as a trained codebook, the training comprising:
assigning, based at least in part on the state data, a first token to represent the previous state of the object;
assigning a second token to represent a characteristic of the vehicle;
assigning a third token to represent a feature of the environment; and
mapping the feature vectors to respective tokens; and
outputting the trained codebook for use by a machine learned model configured to access tokens from the trained codebook and to arrange the first token, the second token, and the third token to represent a potential interaction between the vehicle and the object.

2. The system of claim 1, wherein the machine learned model is a transformer model, and the actions further comprising:
causing the transformer model to arrange the tokens based at least in part on a number of tokens and an order of the tokens.

3. The system of claim 1, wherein:
the feature vectors represent continuous variables,
the tokens represent discrete latent variables, and
mapping the feature vectors to respective tokens comprises mapping the continuous variables associated with the feature vectors to the discrete latent variables associated with the tokens.

4. The system of claim 1, the actions further comprising:
receiving, by the training component, environmental data representing the feature of the environment,
wherein training the codebook further comprises assigning the second token to represent the feature of the environment, and
the codebook is usable by the machine learned model to cause generation of a scene with the feature in the environment.

5. The system of claim 1, wherein the vehicle is an autonomous vehicle.

6. A method comprising:
receiving, by a training component, state data representing a previous state of an object or a vehicle in an environment;
receiving, by the training component, feature vectors representing the vehicle and the object in the environment;
training a codebook to output a trained codebook, the training comprising:
assigning, based at least in part on the state data, a first token to represent the previous state of the object;
assigning a second token to represent a characteristic of the vehicle;
assigning a third token to represent a feature of the environment; and
mapping the feature vectors to respective tokens; and
outputting the trained codebook for use by a machine learned model configured to access tokens from the trained codebook and to arrange the first token, the second token, and the third token to represent a potential interaction between the vehicle and the object.

7. The method of claim 6, further comprising:
determining a number of tokens to include in the codebook; and
determining an order of the tokens.

8. The method of claim 6, further comprising:
causing the machine learned model to arrange the tokens based at least in part on a number of tokens and an order of the tokens.

9. The method of claim 6, wherein:
the feature vectors represent continuous variables,
the tokens represent discrete latent variables, and
mapping the feature vectors to respective tokens comprises mapping the continuous variables associated with the feature vectors to the discrete latent variables associated with the tokens.

10. The method of claim 6, further comprising:
receiving, by the training component, environmental data representing the feature of the environment,
wherein training the codebook further comprises assigning the second token to represent the feature of the environment, and
the codebook is usable by the machine learned model to cause generation of a scene with the feature in the environment.

11. The method of claim 6, wherein the state data representing the previous state of the object or the vehicle comprising one or more of: position data, orientation data, heading data, velocity data, speed data, acceleration data, yaw rate data, or turning rate data.

12. The method of claim 6, further comprising:
inputting image data into an encoder; and
outputting, by the encoder, the feature vectors,
wherein receiving the feature vectors by the training component comprises receiving the feature vectors from the encoder.

13. The method of claim 6, wherein:
the feature vectors represent the characteristic of the vehicle and a characteristic of the object in the environment.

14. The method of claim 6, wherein mapping the feature vectors to respective tokens comprises:
identifying an action or a state of the vehicle associated with a first feature vector of the feature vectors;
comparing the characteristic of the vehicle associated with the first feature vector to a characteristic associated with one or more of the tokens.

15. The method of claim 6, wherein the vehicle is an autonomous vehicle.

16. One or more non-transitory computer-readable media storing instructions that, when executed, cause one or more processors to perform actions comprising:
receiving, by a training component, state data representing a previous state of an object or a vehicle in an environment;
receiving, by the training component, feature vectors representing the vehicle and the object in the environment;
training a codebook to output a trained codebook, the training comprising:
assigning, based at least in part on the state data, a first token to represent the previous state of the object;
assigning a second token to represent a characteristic of the vehicle;
assigning a third token to represent a feature of the environment; and
mapping the feature vectors to respective tokens; and
outputting the trained codebook for use by a machine learned model configured to access tokens from the trained codebook and to arrange the first token, the second token, and the third token to represent a potential interaction between the vehicle and the object.

17. The one or more non-transitory computer-readable media of claim 16, wherein the machine learned model is a first machine learned model, and the actions further comprising:
causing the machine learned model to arrange the tokens based at least in part on a number of tokens and an order of the tokens.

18. The one or more non-transitory computer-readable media of claim 16, wherein:
the feature vectors represent continuous variables,
the tokens represent discrete latent variables, and
mapping the feature vectors to respective tokens comprises mapping the continuous variables associated with the feature vectors to the discrete latent variables associated with the tokens.

19. The one or more non-transitory computer-readable media of claim 16, the actions further comprising:
receiving, by the training component, environmental data representing the feature of the environment,
wherein training the codebook further comprises assigning the second token to represent the feature of the environment, and
the codebook is usable by the machine learned model to cause generation of a scene with the feature in the environment.

20. The one or more non-transitory computer-readable media of claim 16, wherein the vehicle is an autonomous vehicle.

* * * * *